United States Patent
Najam et al.

(10) Patent No.: US 7,428,618 B2
(45) Date of Patent: *Sep. 23, 2008

(54) APPARATUS AND METHOD FOR INTERFACING WITH A HIGH SPEED BI-DIRECTIONAL NETWORK

(75) Inventors: Zahid Najam, San Jose, CA (US);
Peder J. Jungck, San Carlos, CA (US);
Macduy T. Vu, Milpitas, CA (US);
Andrew T Nguyen, San Jose, CA (US);
Gregory Scott Triplett, Pleasanton, CA (US)

(73) Assignee: Cloudshield Technologies, Inc., Sunnyvale, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 11/060,989

(22) Filed: Feb. 18, 2005

(65) Prior Publication Data
US 2006/0004912 A1    Jan. 5, 2006

Related U.S. Application Data

(63) Continuation of application No. 09/858,324, filed on May 15, 2001, now Pat. No. 7,082,502.

(51) Int. Cl.
*G06F 13/00* (2006.01)
(52) U.S. Cl. ........................ 711/147; 709/213; 709/253; 712/225; 718/100
(58) Field of Classification Search ........................ None
See application file for complete search history.

(56) References Cited

U.S. PATENT DOCUMENTS 4,692,918 A * 9/1987 Elliott et al. ................ 370/401

(Continued)

FOREIGN PATENT DOCUMENTS

EP     0 865 180 A2    3/1998

(Continued)

OTHER PUBLICATIONS

John Pescatore, Gartner Analyst, "Commentary: Digging into the DNS foundation," obtained at internet address, http://news.cnet.com/news/0-1005-202-2080091.html, Jun. 15, 2000.

(Continued)

*Primary Examiner*—B. James Peikari
(74) *Attorney, Agent, or Firm*—James L. Katz; Brinks Hofer Gilson & Lione

(57) ABSTRACT

A method and apparatus for processing a bi-directional dataflow are disclosed which permits the transparent movement of data from one processor to another via a shared memory fabric which is connected with both processors. This permits the incoming data of a first processor to be utilized by a second processor thereby freeing that processor from having to handle incoming data. Further, the second processor can handle outgoing data exclusively, freeing the first processor from having to handle outgoing data. In this way, each direction of a bi-directional dataflow may be handled by the maximum capability of a bi-directional capable processing device. The shared memory may comprise a plurality of banks of synchronous dynamic random access memory (SDRAM) devices, and may be used to store packet data in a network.

17 Claims, 11 Drawing Sheets

U.S. PATENT DOCUMENTS

| | | | | |
|---|---|---|---|---|
| 5,195,181 | A | * | 3/1993 | Bryant et al. ............... 709/215 |
| 5,566,170 | A | * | 10/1996 | Bakke et al. ................ 370/392 |
| 5,784,582 | A | * | 7/1998 | Hughes ....................... 710/117 |
| 5,805,820 | A | | 9/1998 | Bellovin et al. |
| 5,867,704 | A | * | 2/1999 | Tanaka et al. ............... 718/105 |
| 5,938,737 | A | | 8/1999 | Smallcomb et al. |
| 5,953,503 | A | | 9/1999 | Mitzenmacher et al. |
| 5,991,713 | A | | 11/1999 | Unger et al. |
| 6,014,660 | A | | 1/2000 | Lim et al. |
| 6,016,512 | A | | 1/2000 | Huitema |
| 6,046,980 | A | | 4/2000 | Packer |
| 6,052,718 | A | | 4/2000 | Gifford |
| 6,070,191 | A | | 5/2000 | Narendran et al. |
| 6,073,168 | A | | 6/2000 | Mighdoll et al. |
| 6,084,878 | A | | 7/2000 | Crayford et al. |
| 6,108,703 | A | | 8/2000 | Leighton et al. |
| 6,247,059 | B1 | * | 6/2001 | Johnson et al. ............. 709/237 |
| 6,424,658 | B1 | * | 7/2002 | Mathur ....................... 370/429 |
| 7,032,031 | B2 | * | 4/2006 | Jungck et al. ............... 709/246 |
| 7,114,008 | B2 | * | 9/2006 | Jungck et al. ............... 709/246 |
| 7,210,022 | B2 | * | 4/2007 | Jungck et al. ................ 712/34 |
| 2002/0009079 | A1 | | 1/2002 | Jungck et al. |
| 2002/0065938 | A1 | | 5/2002 | Jungck et al. |
| 2003/0009651 | A1 | | 1/2003 | Najim et al. |

FOREIGN PATENT DOCUMENTS

| | | |
|---|---|---|
| WO | WO 98/17039 | 4/1998 |
| WO | WO 99/05584 | 2/1999 |
| WO | WO 99/09725 | 2/1999 |
| WO | WO 99/27684 | 6/1999 |
| WO | WO 99/60459 | 11/1999 |
| WO | WO 00/14938 | 3/2000 |
| WO | WO 00/27092 | 5/2000 |
| WO | WO 00/28713 | 5/2000 |

OTHER PUBLICATIONS

Rainbow Technologies Products, "CryptoSwift eCommerce Accelerator," obtained at internet address, http://isg.rainbow.com/products/cs_1.html, Aug. 5, 2000.
Microsoft Corporation, Sep. 1998 "Introduction to TCP/IP," obtained at internet address http://msdn.microsoft.com/library/backgrnd/html/tcpipintro.htm.
Robert Stone, "CenterTrack: An IP Overlay Network for Tracking DoS Floods," Article Oct. 1, 1999, pp. 1-9.
L. Peter Deutsch, "DEFLATE Compressed Data Format Specification," May 1996.
Antaeus Feldspar, Article, "An Explanation of the Deflate Algorithm," Sep. 11, 1997.
ArrowPoint Communications™ CDDCenter Vendor Listing, "ArrowPoint CS-50 Highlights" obtained at internet address http://www.cddcenter.com/arrowpoint.htm, May 21, 2000.
Peter Christy, Analyst Commentary, "When to Distribute Content—The Peters' Principles," obtained at internet address http://www.cddcenter.com/index.html, May 21, 2000.
CDDCenter, "How Do Caching and Content Delivery Really Differ?" obtained at internet address http://www.cddcenter.com/cachingvcontent.htm, pp. 1-4, May 21, 2000.
Internet Research Group "Infrastructure Application Service Providers," Feb. 2000, pp. 1-7.
Steven Vonder Haar, Inter@ctive Week, Feb. 14, 2000, "Content Delivery Shifts To Edge of Net," obtained at internet address http://www.zdnet.com/intweek/stories/news/0,4164,2436865,00.html, dated May 22, 2000.
David Willis, Network Computing, "The Content-Delivery Edge," obtained at internet address http://www.networkcomputing.com/1103/1103colwillis.html, dated May 22, 2000.
Phrack Magazine, "IP-spoofing Demystified (Trust-Relationship Exploitation)" vol. Seven, Issue Forty-Eight, File 14 of 18. pp. 1-9, obtained at internet address http://www.fc.net/phrack/files/p48/p48-14.html, dated Jun. 5, 2000.
Eddie Mission, "What is Eddie?", obtained at internet address http://www.eddieware.org/what.html, dated Apr. 21, 2000.
Alteon Web Systems, White Paper "Optimizing ISP Networks and Services with DNS Redirection," Aug. 1999.
Alteon Web Systems, White Paper "Virtual Matrix Architecture Scaling Web Services for Performance and Capacity," Apr. 2000.
RFC2267 Working Group- Denial of Service Counter Measures, Tele-conference Meeting Aug. 25, 2000, Moderator, Henry Teng of eBay.
Track-back Architecture General Requirements Version 0.1, Initial Draft submitted to Counter-DoS Solutions Working Group, Jul. 31, 2000, Edited by Bob Geiger, Recourse Technologies.
C-Port™ A Motorola Company, C-5™ Digital Communications Processor, Product Brief, pp. 1-8, May 4, 2000.
Agere, Inc. "The Challenge for Next Generation Network Processors", Sep. 10, 1999.
Intel "IXP1200 Network Processor," Datasheet, pp. 1-109 (out of 146 pages), May 2000.
Philips Semiconductors—12C-bus, News and Events, obtained at internet address, http://www.semiconductors.philips.comi2c/, Jul. 28, 2001.
Comnet Booth #4421 "VHB Technologies Introduces Breakthrough Appliance for High-Bandwidth Networks at Comnet" News Release, Jan. 29, 2001, VHB Technologies, Inc., Richardson, Texas.
Netlogic Microsystems™ Product Brief, obtained at internet address, http://www.netlogicmicro.com/html/datasheets/nse3128.html, pp. 1-2, May 11, 2001.
C-Port, "C-5™ Digital Communications Processor" Product Brief, pp. 1-8, © 1999-2000 C-Port Corporation, May 4, 2000.
Level One™ an Intel Company "IXF1002 Dual Port Gigabit Ethernet MAC," product brief, pp. 1-2, Copyright © 2000 Level One Communications, Inc.
Agere, Inc., Agere White Paper, "Building Next Generation Network Processors," Sep. 10, 1999, pp. 1-8.
Eric J. Rothfus, Agere, Inc., Agere White Paper, "The Case for A Classification Language," Sep. 10, 1999, pp. 1-7.
Philips "VMS747 Security Processor," Overview and Features, pp. 1-3, date of release Jan. 2000, © Philips Electronics N.V. 1999.
CloudShield Technologies, Inc., White Paper, "Security at Optical Speed," pp. 1-10, Jan. 21, 2001.
NetLogic Microsystems™ Product Brief "NSE3128 Network Search Engine," obtained at internet address http://209.10.226.214/html/datasheets/nse3128.html pp. 1-2, May 11, 2001.
Listing of Well Known Port Numbers assigned by the Internet Assigned Numbers Authority, obtained at the internet address, http://www.iana.org/assignments/port-numbers pp. 1-55, Aug. 5, 2000.
PM2329 PMC-Sierra, "ClassiPI™ Network Classification Processor," Overview and Features sheet pp. 1-2, 2001 Copyright PMC-Sierra, Inc. Jan. 2001.

* cited by examiner

400

800

APPARATUS AND METHOD FOR INTERFACING WITH A HIGH SPEED BI-DIRECTIONAL NETWORK

RELATED APPLICATIONS

The present patent document is a continuation under 37 C.F.R. § 1.53(b) of application Ser. No. 09/858,324, filed May 15, 2001, now U.S. Pat. No. 7,082,502, which is hereby incorporated by reference.

The following co-pending and commonly assigned U.S. Patent Applications relate to and further describe other aspects of the embodiments disclosed in the present application and are herein incorporated by reference:

U.S. patent application Ser. No. 09/858,309, "EDGE ADAPTER APPARATUS AND METHOD", filed May 15, 2001. now U.S. Pat. No. 7,032,031;

U.S. patent application Ser. No. 09/858,323, "EDGE ADAPTER ARCHITECTURE APPARATUS AND METHOD", filed May 15, 2001, now U.S. Pat. No. 7,114,008;

U.S. patent application Ser. No. 09/858,308, "APPARATUS AND METHOD FOR INTERCONNECTING A PROCESSOR TO CO-PROCESSORS USING SHARED MEMORY", filed May 15, 2001, now U.S. Pat. No. 7,210,022.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer networks, in general, interconnect multiple computer systems for the purpose of sharing information and facilitating communications. Computer networks may include private networks which interconnect computers within a particular enterprise, such as an intranet, and public networks, which interconnect one or more of the computers of enterprises, public institutions and/or private individuals. One exemplary public network is the Internet. The Internet is a packet switched network which utilizes the Transmission Control Protocol/Internet Protocol ("TCP/IP") suite to communicate data.

Networking computers together generally increases efficiency and reduces wasted resources. These advantages are spurring significant growth in the number of computers/user being connected by networks and the volume of data they are exchanging. This growth is, in turn, spurring advances in network technologies to handle the increased demand being placed on these network infrastructures.

This is evident on the Internet where each day more and more users connect to the Internet adding to the millions of existing users already communicating and exchanging data via this public infrastructure. Further, new applications for the network, such as streaming video, telephony services, real time interactive content, instant messaging, and peer to peer communications continue to be developed in addition to the exponential growth in the user of traditional network applications, such as the world wide web and electronic mail. This growth is placing an incredible strain on the Internet infrastructure that causes network traffic to slow and hardware to overload. In particular, some of these new applications for the network are dependent upon the quality of service ("QoS") of the network and cannot tolerate arbitrary reductions in throughput. For example, traffic interruptions in a voice telephony application may result in garbled or delayed communications which may not be tolerable to the users of such an application.

A way to solve these resultant network traffic jams is to increase the speed of the network and increase its bandwidth. Another solution is to retrofit the existing infrastructure to use new technologies, such as optical fiber interconnections, which substantially increases network throughput and bandwidth.

Unfortunately, a network, and in particular the Internet, is not simply a collection of interconnections. Other devices, such as routers, switches, hubs, and cache servers, form an integral part of the network infrastructure and play important roles in its performance. Upgrading the interconnections of the network without also upgrading the hardware which makes all of those interconnections function, will only serve to move the bottlenecks but not eliminate them. Further, hardware devices, which seek to enhance the network, such as content delivery devices or security devices, must similarly be upgraded so as not to degrade any overall enhancements to the network infrastructure.

While network technologies continue to advance, some of these technologies advance at a quicker pace than others. Where these technologies interface, it is often necessary to adapt the slower evolving technology to keep up with the faster evolving technology. In such a case, advances in optical networking technologies are far exceeding advances in the technologies to enhance the communications being carried by the network.

In particular, many network enhancement applications, such as security applications or content delivery applications, require the interception and processing of data from the network in order to perform their function. By default then, these devices become a choke point through which all the data of the network must pass. Therefore, this interception and processing device needs to operate at or beyond the wire speed, i.e. the operating throughput of the network, or the device becomes a bottle neck. In most cases, where the device cannot keep pace with the network, any benefits of the application will be outweighed by the degradation caused in network throughput. Unfortunately, optical networking technologies are increasing wire speeds beyond the current capabilities of packet processing technology.

Accordingly, there is a need for a way to cost effectively adapt existing packet processing technologies so as not to degrade network performance.

SUMMARY

The present invention is defined by the following claims, and nothing in this section should be taken as a limitation on those claims. By way of introduction, the preferred embodiments described below relate to a bi-directional data processor. The processor includes a first processor coupled with a bi-directional interface and operative to receive data from the bi-directional interface and perform a first task on the data and a shared memory coupled with the first processor, the shared memory including first and second banks. One of the first and second banks is accessible to the first processor. The first processor is further operative to store the processed data in the accessible one of the first and second banks of the shared memory. The stored processed data is then mirrored to the other of the first and second banks of the shared memory. The processor further includes a second processor coupled with the shared memory and the bi-directional interface. The second processor is operative to retrieve the stored processed data from the other of the first and second banks of the shared memory, perform a second task on the data and selectively transmit the secondarily processed data back to the bi-directional interface.

The preferred embodiments further relate to a method of processing data in a bi-directional processing device. In one embodiment, the method includes receiving the data by a first processor from a bi-directional interface, the first processor operative to perform a first task on the data, storing the processed data in a shared memory by the first processor, said shared memory comprising first and second banks, wherein one of said first and second banks is accessible to said first processor and the other of said first and second banks is accessible to a second processor, mirroring said processed data stored by said first processor in said one of said first and second banks to the other of said first and second banks, retrieving the processed data from said other of said first and second banks of the shared memory by a second processor operative to perform a second task on the processed data, thereby resulting in secondarily processed data, and transmitting, selectively, the secondarily processed data to the bi-directional interface from the second processor.

Further aspects and advantages of the invention are discussed below in conjunction with the preferred embodiments.

DETAILED DESCRIPTION OF THE PRESENTLY PREFERRED EMBODIMENTS

Meeting the universal demand for an Internet that is more robust, that is capable of sustaining its own growth and that can adapt to new technologies, requires the migration of the current network infrastructure to next generation networking technologies. This next generation data network is often referred to as the "Optical Internet."

The shift to the Optical Internet has created a new set of challenges. Chief among these challenges is the need to manage an exponentially higher volume of network traffic at much higher rates of speed. In the U.S., the principal standard for optical networks is the American National Standards Institute ("ANSI") standard for synchronous data transmission over optical media known as Synchronous Optical Network ("SONET"). The SONET standard actually comprises multiple standards for transmission rates up to 9.953 gigabits per second ("Gbps") with the capability to go up to 20 Gbps. Each transmission rate standard is known as an Optical Carrier Level ("OC-X"). Exemplary optical carrier levels include OC-12 for communications at 622.08 Mbps, OC-48 for communications at 2.488 Gbps and OC-192 for communications at 10 Gbps. Today's microprocessors face a situation where they cannot support the pace of performance increases associated with the deployment of fiber-based network bandwidth of OC-48 and higher. Simply put, the move to fiber-optic networks has pushed the physical limits of microprocessors and the input/output (I/O) bus beyond their current technical capabilities. The platform described herein is designed to address many issues associated with Optical Internet services that cannot be addressed by the current software based firewall servers.

Figure 1:
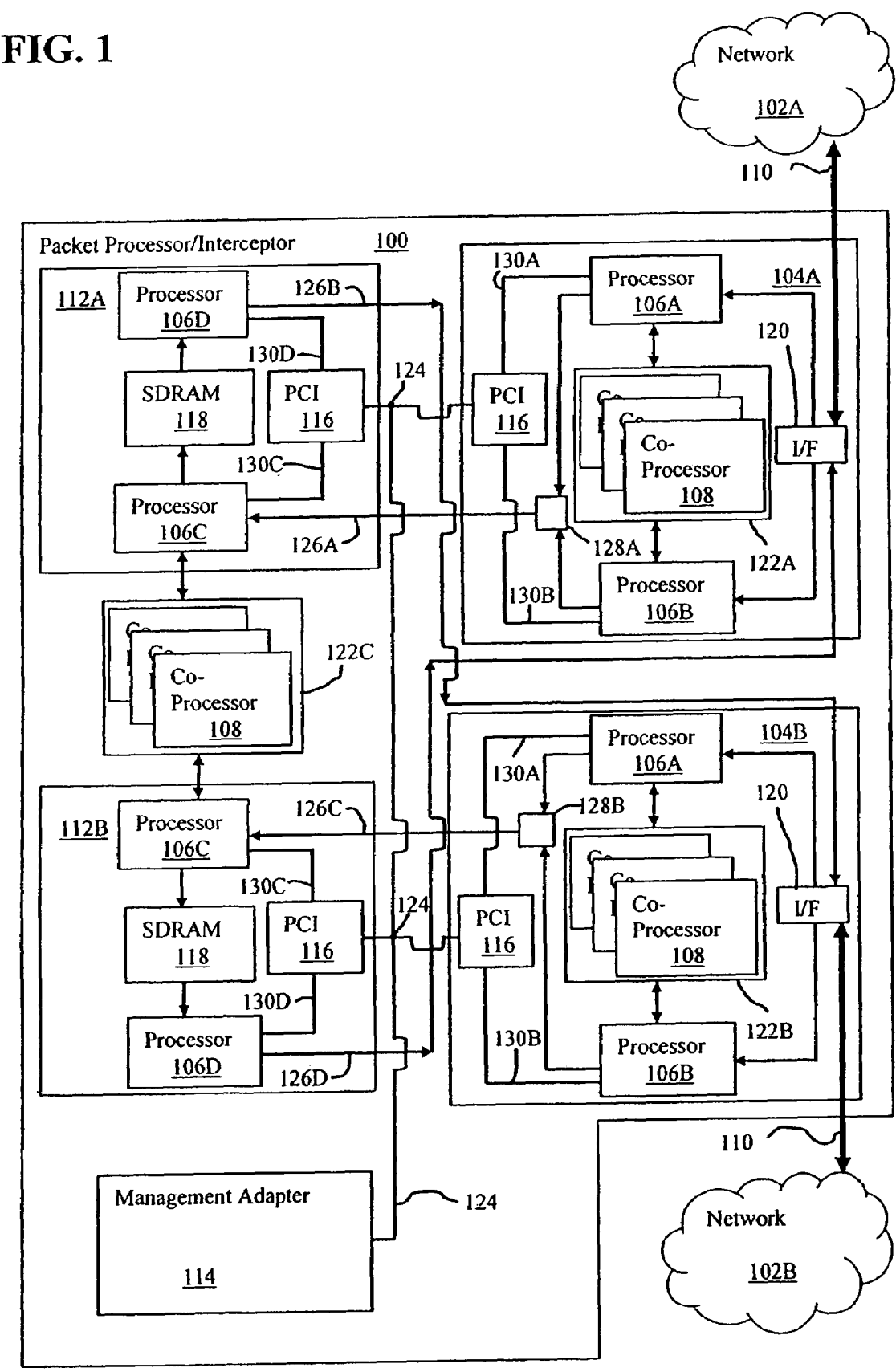
FIG. 1 depicts a block diagram of an exemplary packet interceptor/processing device.

FIG. 1 shows an exemplary device 100 for intercepting and processing packets at wire speed from an optical based network 102, such as the Internet, compatible with the OC-48 standard or faster. For a more detailed explanation of the operation of devices which intercept and process packets, refer to U.S. patent application entitled "EDGE ADAPTER APPARATUS AND METHOD" and U.S. patent application Serial entitled "EDGE ADAPTER ARCHITECTURE APPARATUS AND METHOD", both of which are referenced above. The exemplary device 100 may include the Rapid Intelligent Processing Platform manufactured by Cloudshield Technologies, Inc., located in San Jose, Calif. For clarity, some components of the device 100 are not shown.

The device 100 is coupled with the network 102 (consisting of an upstream network portion 102A and a downstream network portion 102B) via a network connection 110 so as to be able to intercept and process packets communicated between the upstream network portion 102A and the downstream network portion 102B of the network 102. Herein, the phrase "coupled with" is defined to mean directly connected to or indirectly connected through one or more intermediate components. Such intermediate components may include both hardware and software based components. In one embodiment, the network connection 110 is an optical network connection. In an alternate embodiment, the network connection 110 is an electrical network connection.

In one embodiment, not shown in the figure, the device 100 is configured as a rack-mount system comprising a chassis which provides power, cooling and a housing for the other components, as described below. The housing further includes a backplane into which the other components plug into and which interconnects those components. Such components may include interface components to couple external devices to add additional processing functionality. The device 100 includes two primary processing elements 104A, 104B which intercept and process packets from the network 102. One primary processing element 104A is coupled with the upstream network 102A and the other primary processing element 104B is coupled with the downstream portion of the network 102B. It will be appreciated that additional primary processing elements 104A, 104B may be provided depending on the topology, physical and logical arrangement of the network 102 and the coupling point of the device 100. Further, the functionality of the processing elements 104A, 104B may be consolidated into a single processing element. In one embodiment, each primary processing element 104A, 104B includes a printed circuit board capable of being plugged into the backplane described above.

The primary function of the primary processing elements 104A, 104B is to perform stateless processing tasks on the incoming packet stream. Stateless processing tasks are tasks that do not require knowledge of what has come before in the packet stream. Stateless tasks include ingress and egress filtering. Ingress and egress filtering involves ensuring that packets arriving from a particular portion of the network actually came from that portion of the network. For example, where the device 100 is programmed with the range of network addresses in the portion of the network 102B downstream of the device 100, packets arriving from that downstream portion with a network address out of range would be detected as invalid and filtered out of the packet stream, or vice versa for the upstream portion of the network 102A. Egress filtering refers to filtering in the upstream to downstream direction and ingress filtering refers to filtering in the downstream to upstream direction. For the filtering function, the filter values are typically maintained in block lists. Note that while filtering is a stateless function, independent of what packets have come before, the device 100 interjects stateful processing, as described below, to dynamically update the filtering or other information required for the stateless processing tasks. While the network processor 106A, 106B on the primary processing elements 104A, 104B can store state information about historical packet activity, each processing element 104A, 104B only sees one direction of the packet flow off the network 102. Therefore, they cannot perform true stateful processing tasks which requires bi-directional visibility. This functionality is provided by the secondary processing elements 112A, 112B, described in more detail below.

The device 100 further includes two secondary processing elements 112A, 112B which are coupled with the primary processing elements 104A, 104B via a command/control bus 124 and packet busses 126A, 126B, 126C, 126D. In one embodiment, each secondary processing element 112A, 112B includes a printed circuit board capable of being plugged into the backplane described above. Additional secondary processing elements 112A, 112B may be included or the functionality of the secondary processing elements 112A, 112B may be consolidated into a single secondary processing element. In one embodiment, the command/control bus 124 is a bus routed over the interconnecting backplane of device 100 and complying with the Compact Peripheral Component Interconnect ("cPCI") standard and is 64 bits wide and operates at a frequency of at least 33 megaHertz (MHz). Exemplary packet busses 126A, 126B, 126C, 126D include busses complying with the IX bus protocol of the Intel® IXP1200 Network Processing Unit, provided by Intel Corporation of Santa Clara, Calif., and are described in more detail below. Each exemplary packet bus 126A, 126B, 126C, 126D may be bi-directional, 64 bits wide and operate at a frequency of at least 84 MHz and may be routed over the backplane described above. Alternatively, other bus technologies/protocols may be used and are dependent upon the implementation of the device 100. The command/control bus 124 carries command and control information between the primary and secondary processing elements 104A, 104B, 112A, 112B. The packet busses 126A, 126B, 126C, 126D carry packet data between the primary and secondary processing elements 104A, 104B, 112A, 112B.

The primary function of the secondary processing elements 112A, 112B is to perform stateful processing tasks, i.e. tasks which are dependent on historical activity. One example of a stateful processing task involves network security applications which require monitoring conversations, i.e. bi-directional packet flow, in the packet stream, typically consisting of requests and responses to those requests. Stateful processing and the ability to monitor traffic bi-directionally allows the secondary processing elements watch for requests and responses and match them up. The arrangement of the inbound network processors 106C of the secondary processing elements 112A, 112B, described in more detail below, allows them to share information about packets coming from either direction, i.e. upstream or downstream. Further, the secondary processing elements 112A, 112B can affect the stateless processing of the primary processing elements 104A, 104B. For example, where the secondary processing elements 112A, 112B determine that packets from a certain network address are consistently invalid, the secondary processing elements 112A, 112B can add that network address to the filtering list of the primary processing elements 104A, 104B thereby dynamically updating the stateless processing environment.

For example, packets such as those traversing between a web browser and web server change port numbers once a session between the two entities is created. A stateless rule cannot be applied that says "don't allow HTTP POST commands from network address ABC" without destroying all communications from the network address ABC. To accomplish the desired filtering and not destroy all communications from the source network address, the device 100 watches for new sessions directed to the web server on port 80 (standard HTTP application port). By watching the traffic, an example session might choose to then communicate on port 23899 at the web server. Only by subsequently watching traffic destined to this new port would the device 100 be able to search for HTTP POST commands that need to be blocked. Once identified, the packets could then be dealt with. If the session startup was not monitored and information not stored for future reference, i.e. not storing state information, an HTTP POST command traversing the network as part of a text stream from a different application, such as a document about how to configure a blocking system, might be falsely identified. Stateful inspection generally requires visibility to traffic in both directions. In the case above, a packet from the client to the server would have shown the request for a new web session. The response from the server to the client would have shown the web server port number to monitor. In firewalls it is also this response that subsequently allows that port number to have future traffic allowed through the firewall. This second port number on the server is the one for which traffic can be subsequently monitored for the HTTP POST. By storing relevant information for future packet processing analysis, the device 100 is made stateful.

In addition, the device 100 includes a management adapter 114 which is coupled with the command/control bus 124. The management adapter 114 is used to manage the device 100 and control the functionality of the primary and secondary processing elements 104A, 104B, 112A, 112B. In one embodiment, the management adapter 114 includes a computer server having dual-PENTIUM III processors manufactured by Intel Corporation, located in Santa Clara, Calif., or suitable alternatives. The management adapter 114 further includes at least 64 MB of RAM and at least 10 GB of hard disk storage. The management adapter 114 is preferably implemented as a single board computer that plugs into the back plane, as described above, although more than one board as well as a stand alone personal computer may also be used. The management adapter 114 further includes an external management interface (not shown) which allows the connection of an external management device (not shown) for programming, controlling and maintaining the device 100. In one embodiment, the external management interface includes a model 82550 100 megabit Ethernet Interface manufactured by Intel Corporation, located in Santa Clara, Calif. Other interfaces, such as serial, parallel, coaxial and optical based interfaces may also be used. In one embodiment, the external management device is a desktop computer such as the Deskpro Model ENS SFF P733 manufactured by Compaq Computer Corporation, located in Houston, Tex. Alternatively, any suitable Pentium™ class computer having suitable memory and hard disk space in addition to Ethernet or other form of network connectivity, may be used. Further, the external management device may be located locally with respect to the device 100 or remotely and connected to the device 100 via a local or wide area network.

The primary processing elements 104A, 104B are preferably capable of operating in parallel. The two primary processing elements 104A, 104B, are also referred to as Media Adapter Cards ("MAC") or Media Blade Adapters ("MBA"). Each primary processing element 104A, 104B includes a network interface 120, two network processors 106A, 106B, a set 122A, 122B of one or more co-processors 108, a packet bus interface 128A, 128B, and a command/control bus PCI interface 116. The network interface 120 is coupled with the network 102 via the network connection 110. In one embodiment, the network connection 110 is an optical network connection operating at a throughput of approximately 2.5 Gbps and a 1, 4 or 16 bit width. Each network processor 106A, 106B is coupled with the network interface 120, in a parallel configuration, to receive packets from the network 102. The network interface 120 converts the protocol, frequency and bus width of the network connection to the protocol, frequency and bus width of the network processors 106A, 106B. The network interface 120 further splits the incoming data among the network processors 106A, 106B, as described below. It will be appreciated that the disclosed embodiments can support any number of network processors 106A, 106B operating in parallel as described below, as the application demands. Further, each secondary processing element 112A, 112B is also coupled with network interface 120 of one of the primary processing elements 104A, 104B via the packet busses 126B, 126D to transmit packets onto the network 102, described in more detail below. The network interface 120 converts the protocol, frequency and bus width of the packet busses 126B, 126D to the protocol, frequency and bus width of the network connection 110. In addition, each network processor 106A, 106B is coupled with a set 122A, 122B of one or more co-processors 108 which is described in more detail below. Further, each network processor 106A, 106B is coupled with the command/control bus 124 via command/control interface busses 130A, 130B and the command/control bus interface 116. In one embodiment, the command/control interface busses 130A, 130B are compliant with the Peripheral Component Interconnet ("PCI") standard and are 32 bits wide and operate at a frequency of at least 33 MHz. Further, the command/control bus interface 116 is a PCI to cPCI bus bridge for interfacing the busses 130A, 130B with the command/control cPCI bus 124, described above. Both network processors 106A, 106B are also coupled with one of the secondary processing elements 112A, 112B via the packet bus interface 128A, 128B and the packet bus 126A, 126B. For a more detailed description of the primary processing element 104A, 104B, please refer to U.S. patent application entitled "APPARATUS AND METHOD FOR INTERCONNECTING A PROCESSOR TO CO-PROCESSORS USING SHARED MEMORY", referenced above.

Each secondary processing element 112A, 112B also includes two network processors 106C, 106D, in a serial configuration, and a command/control bus interface 116. It will be appreciated that additional serial network processors 106C, 106D may be included on the secondary processing elements 112A, 112B according to the disclosed embodiments to improve processing ability as the application demands. Each of the network processors 106C, 106D is coupled with the command/control bus 124 via the command/control interface busses 130C, 130D and the command/control bus interface 116. In one embodiment, the command/control interfaces are 33 MHz 32 bit PCI compliant as described above and the command/control bus interface 116 is a PCI-to-cPCI bus bridge as described above. One of the network processors 106C is coupled with both network processors 106A, 106B of one of the primary processing elements 104A, 104B via the packet bus 126A, 126C and the packet bus interface 128A, 128B for receiving packet data from the primary processing elements 104A, 104B. The other of the network processors 106D is coupled with the network interface 120 of the other of the primary processing elements 104A, 104B via the packet bus 126B, 126D for sending packet data to the network 102. The secondary processing elements 112A, 112B are also referred to as Intelligent Packet Adapters ("IPA").

Each secondary processing element 112A, 112B further includes a shared synchronous dynamic RAM ("SDRAM") memory 118 coupled between each of the network processors 106C, 106D to allow the network processors 106C, 106D to operate uni-directionally and move data from the inbound network processor 106C to the outbound network processor 106D, described in more detail below.

In addition, one of the network processors 106C, from each secondary processing element 112A, 112B is coupled with a set 122C of co-processors 108. It will be appreciated that the embodiments disclosed below relating to the sharing of co-processors 108 sets 122A, 122B between the two network processors 106A, 106B of the primary processing element 104A, 104B are applicable to the arrangement of the co-processors 108 and the secondary processing elements 112A, 112B. In one embodiment of the secondary processing elements 112A, 112B, the network processors 106C which are sharing the co-processors 108 of set 122C are located on two different circuit boards (one for each element 112A, 112B) which share a common daughter card containing the set 122C of co-processors 108. For more information on the arrangement and operation of the daughter cards and co-processor sets 122C, refer to U.S. patent application entitled "APPARATUS AND METHOD FOR INTERCONNECTING A PROCESSOR TO CO-PROCESSORS USING SHARED MEMORY", referenced above.

Each network processor 106C, 106D handles one direction of the bi-directional packet flow coming to/from the secondary processing elements 112A, 112B. In particular, the inbound network processor 106C handles traffic incoming to the secondary processing element 112A, 112B and performs inspection and analysis tasks. The outbound network processor 106D handles outgoing traffic from the secondary processing element 112A, 112B and performing actions on the packet such as modification, cleansing/deletion or insertion of new or replacement packets. By serializing the network processors 106C, 106D on the secondary processing elements 112A, 112B, the processing of packets can be divided into steps and distributed between the two network processors 106C, 106D. It will be appreciated more network processors 106C, 106D may be coupled serially to enhance the ability to sub-divide the processing task, lowering the burden on any one network processor 106C, 106D only at the cost of the latency added to the packet stream by the additional network processors 106C, 106D and the additional hardware cost. The network processors 106C, 106D intercommunicate and share data via an SDRAM memory fabric to implement this serial packet flow, described in more detail below.

Further each secondary processing element 112A, 112B handles a different direction of packet flow from the network 102. In particular, the upstream secondary processing element 112A handles packets flowing from the network upstream portion 102A of the device 100 to the network downstream portion 102B of the device 100. The downstream secondary processing element 112B handles packets flowing from the network 102B downstream of the device 100 to the network 102A upstream of the device 100.

The device 100 intercepts and processes packets from the network 102. One "upstream" primary processing element 104A intercepts packets arriving from the network upstream portion 102A of the device 100 and the other "downstream" primary processing element 104B intercepts packets arriving from the network downstream portion 102B of the device 100. The intercepted packets are pre-processed, as described above, and then passed on to a corresponding secondary processing element 112A, 112B for subsequent processing and possible release back to the network 102. Further, within each primary processing element 104A, 104B, the network interface 120 converts the protocol, frequency and bus width of the network connection 110 to the protocol, frequency and bus width of the network processors 106A, 106B and splits the incoming packet stream among the two network processors 106A, 106B which process packets in parallel (explained in more detail below). In one embodiment, the packet stream is alternated between the network processors 106A, 106B in a "ping-pong" fashion, i.e. a first packet going to one network processor 106A, 106B, the second packet going to the other network processor 106A, 106B and the next packet going back to the first network processor 106A, 106B, and so on. For more detail on this parallel packet processing architecture, refer to U.S. patent application entitled "EDGE ADAPTER ARCHITECTURE APPARATUS AND METHOD", referenced above. The network processors 106A, 106B are further coupled with the packet bus interface 128A, 128B which couples both network processors 106A, 106B with the common packet bus 126A, 126C to the secondary processing elements 112A, 112B.

For example, a packet traveling from the network 102A upstream of the device 100 to the network 102B downstream of the device 100 is intercepted by the network interface 120 of the upstream primary processing element 104A. The network interface 120 passes the intercepted packet to one of the network processors 106A, 106B which preliminarily process the packet as described above. This may involve the shared co-processors 108, as described below. The packet is then transmitted to the inbound network processor 106C of the upstream secondary processing element 112A for subsequent processing via the packet bus interface 128A and the packet bus 126A. Within the upstream secondary processing element 112A, the packet is processed and moved from the inbound network processor 106C to the outbound network processor 106D via the SDRAM memory fabric 118. This processing may involve processing by the shared co-processors 122. If it is determined that the packet is to be released, in original or modified form, the outbound network processor 106D sends the packet to the network interface 120 of the downstream primary processing element 104B via the packet bus 126B. The network interface 120 of the downstream primary processing element 104B then transmits the packet back onto the network 102B.

For packets traveling from the network downstream portion 102B of the device 100 to the network upstream portion 102A of the device 100, the packets are intercepted by the network interface 120 of the downstream primary processing element 104B. The network interface 120 passes the intercepted packet to one of the network processors 106A, 106B which preliminarily process the packet as described above. This may involve the shared co-processors 108, as described below. The packet is then transmitted to the inbound network processor 106C of the downstream secondary processing element 112B for subsequent processing via the packet bus interface 128B and packet bus 126C. Within the downstream secondary processing element 112B, the packet is processed and moved from the inbound network processor 106C to the outbound network processor 106D via the SDRAM memory fabric 118. This processing may involve processing by the shared co-processors 122. If it is determined that the packet is to be released, in original or modified form, the outbound network processor 106D sends the packet to the network interface 120 of the upstream primary processing element 104A via the packet bus 126D. The network interface 120 of the upstream primary processing element 104A then transmits the packet back onto the network 102A.

Overall, the device 100 intercepts packets flowing in an up or downstream direction, processes them and determines a course of action based on the application that the device 100 is implementing. Such actions include, for example, releasing the packet to the network 102, modifying the packet and releasing it to the network 102, deleting the packet, substituting a different packet for the intercepted packet, forwarding the packet to additional internal or external processing resources (not shown), logging/storing information about the packet, or combinations thereof. Applications include content delivery application or security applications such as for preventing unauthorized network access or preventing denial of service attacks.

The network processor 106A, 106B, 106C, 106D used in the primary and secondary processing elements 104A, 104B, 112A, 112B is preferably a general purpose network processor which is suitable for a wide variety of network applications. In one embodiment, each primary and secondary processing element 104A, 104B, 112A, 112B includes two network processors 106A, 106B, 106C, 106D and supporting hardware (not shown), as described above. An exemplary network processor 106A, 106B, 106C, 106D is the Intel® IXP1200 Network Processor Unit, manufactured by Intel Corporation, located in Santa Clara, Calif. For more detailed information about the exemplary processor 106, please refer to Intel® IXP1200 Network Processor Datasheet part no. 278298-007 published by Intel Corporation, located in Santa Clara, Calif. This exemplary network processor 106A, 106B provides six micro-engines/path-processors for performing processing tasks and a StrongARM™ control processor. Each of the network processors 106A, 106B, 106C, 106D preferably operates a frequency of 233 MHz or faster, although slower clock speeds may be used. It will be appreciated that other network specific or general purpose processors may be used.

Figure 2:
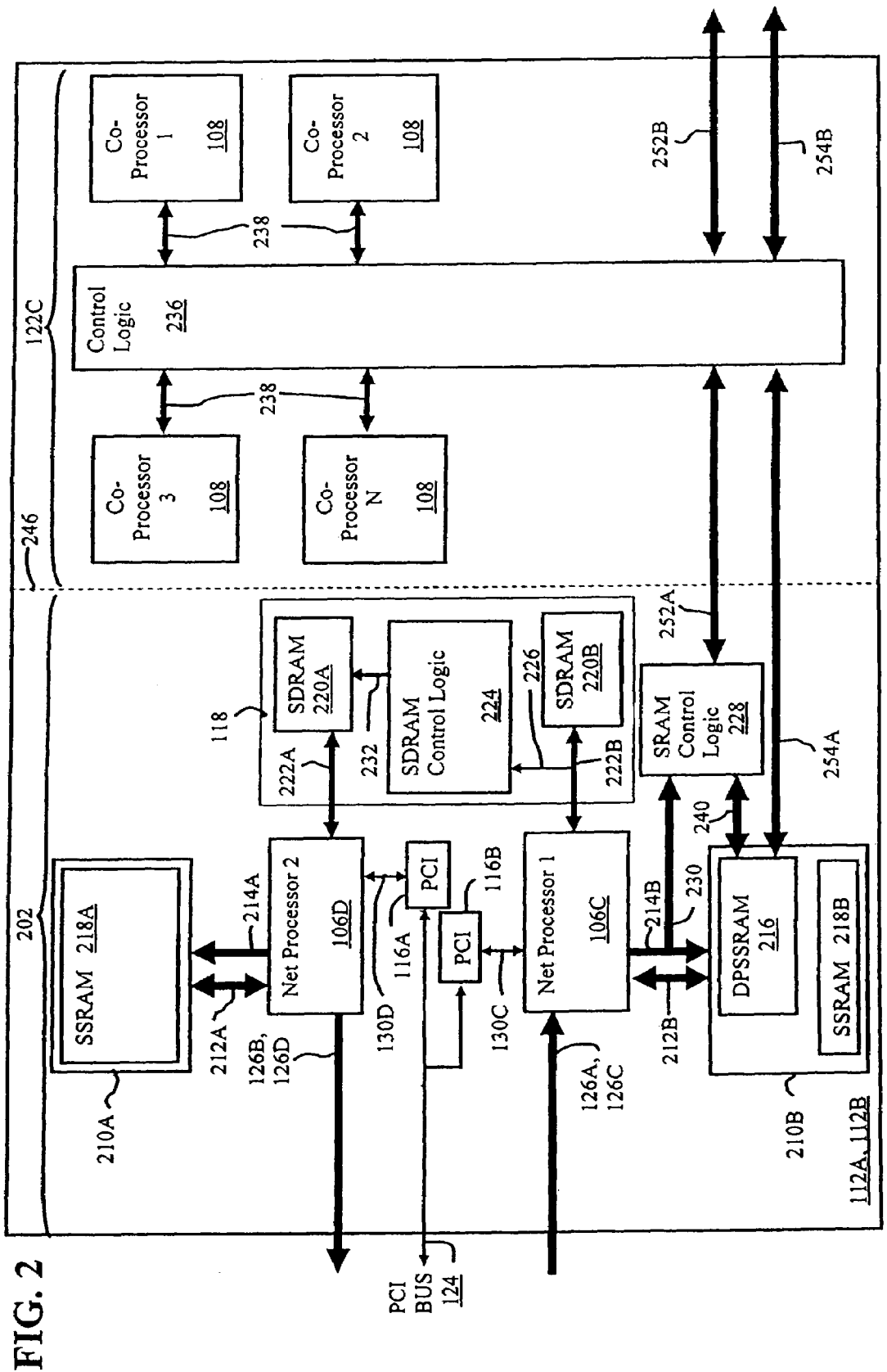
FIG. 2 depicts a block diagram of an exemplary secondary processing element coupled with a set of co-processors.

FIG. 2 shows a detailed diagram of the secondary processing element 112A, 112B. The secondary processing element 112A, 112B, includes one inbound network processor 106C and one outbound network processor 106D. The inbound network processor 106C is coupled with the inbound packet bus 126A, 126C from the primary processing elements 104A, 104B. The outbound network processor 106D is coupled with the outbound packet bus 126B, 126D to the primary processing elements 104A, 104B, as described above. Both network processors 106C, 106D are coupled with command/control bus interfaces 116A, 116B via the command/control interface busses 130C, 130D which interface the network processors 106C, 106D to the command/control bus 124. In one embodiment, the command/control interface busses are 32 bit PCI compliant busses operating at 33 MHz and the commands/control bus interfaces 116A, 116B comprise PCI to cPCI bridge interface 116A, 116B which interfaces the network processor 106A, 106B to the 64 bit wide 66 MHz command/control cPCI bus 124. The command/control cPCI bus 124 interconnects the primary processing element 104A, 104B with other processing elements 104 and other resources (not shown) of the device 100 allowing the sharing of data and distribution of packet processing. The PCI to cPCI bridge interface 116A, 116B includes a model I21154, manufactured by Intel Corporation, located in Santa Clara, Calif. Alternatively, other bus architectures may be used for communication among the components of the device 100.

In one embodiment, the network processors 106C, 106D are Intel IXP1200 network processors, described above, which provide a 64 bit IX bus interface. The inbound and outbound packet busses 126A, 126C, 126B, 126D are coupled with the IX bus interface of the corresponding network processor 106C, 106D and each is 64 bits wide and operating at a frequency of at least 84 MHz, as described above. It will be appreciated that the input/output interfaces and bus protocols are processor architecture dependent and vary among manufacturers.

Each network processor 106C, 106D, is further coupled with a bank 210A, 210B of synchronous burst static random access memory ("SSRAM") via an SSRAM data interface 212A, 212B and an SSRAM address interface 214A, 214B provided by the network processor 106C, 106D. In one embodiment, the SSRAM data and address interfaces 212A, 212B, 214A, 214B are each 32 bits wide and operate at a frequency of at least 100 MHz. Each bank 210A, 210B of SSRAM includes a block 218A, 218B of one or more single port SSRAM devices.

The SSRAM bank 210B of the inbound network processor 106C further includes a block 216 of one or more dual port SSRAM ("DPSSRAM") devices. The combined blocks 216 and 218B for the inbound network processor 106C are configured as a contiguous address space to the network processor 106C.

The inbound network processor 106C is further coupled with SRAM control logic 228 via the SRAM control logic address interface 230. The SRAM control logic 228 is also coupled with the DPSSRAM block 216 via the control logic DPSSRAM interface 240. The DPSSRAM block 216 is also coupled with the daughter card 122C via the DPSSRAM daughter card interface 254A. In one embodiment, the DPSSRAM daughter card interface is at least 32 bits wide and operates at a frequency of at least 100 MHz. The SRAM control logic 228 is coupled with the daughter card 122C via SRAM control logic daughter card interfaces 252A. In one embodiment, the SRAM control logic 228 is a custom designed device using a CMOS Programmable Logic Device ("CPLD").

The secondary processing element 112A, 112B further includes a daughter card connector 246 for connecting an auxiliary printed circuit board, also known as a daughter card, 122C to the main circuit board 202 of the secondary processing element 112A, 112B. The elements 112A, 112B are interleaved such that the Net processor 106C, 106D access 112A, 112B as 32 bit devices at the dictated nominal clock of 100 MHz. The elements 112A, 112B interface through connector 246 to co-processor control logic 236 with a 64 bit bus. This implementation allows the same throughput from the Net processor but at half the clock speed to the daughter card and the co-processor control logic 236. In one embodiment, the daughter card connector 246 includes a 140 pin high density connector. An exemplary high density connector is the QStrip™ QTE/QSE series connector from Samtec, Inc. located in New Albany, Ind. Alternatively, other connector interfaces and protocols may be used. An exemplary configuration for the connector 246 is (MB=main circuit board 202, CC=daughter card 122C):

| SYMBOL | Direction | DESCRIPTION |
|---|---|---|
| GND | MB to CC | Ground |
| RST# | MB to CC | Chip reset. |
| MCLK | MB to CC | Chip Master clock. |
| DP_A(1) | CC to MB | Dual-Port SRAM address. |
| DP_A(2) | CC to MB | Dual-Port SRAM address. |
| DP_A(3) | CC to MB | Dual-Port SRAM address. |
| DP_A(4) | CC to MB | Dual-Port SRAM address. |
| DP_A(5) | CC to MB | Dual-Port SRAM address. |
| DP_A(6) | CC to MB | Dual-Port SRAM address. |
| DP_A(7) | CC to MB | Dual-Port SRAM address. |
| DP_A(8) | CC to MB | Dual-Port SRAM address. |
| DP_A(9) | CC to MB | Dual-Port SRAM address. |
| DP_A(10) | CC to MB | Dual-Port SRAM address. |
| DP_A(11) | CC to MB | Dual-Port SRAM address. |
| DP_A(12) | CC to MB | Dual-Port SRAM address. |
| DP_A(13) | CC to MB | Dual-Port SRAM address. |
| DP_A(14) | CC to MB | Dual-Port SRAM address. |
| DP_WE# | CC to MB | Dual-Port SRAM write enable. |
| DP_CE# | CC to MB | Dual-Port SRAM chip enable. |
| DP_CLK | CC to MB | Dual-Port SRAM clock. |
| DP_D(63:0) | Bi-direction | Dual-Port SRAM data. |
| AFC_D(63:0) | MB to CC | Address Filter Chip data. |
| AFC_RD# | CC to MB | Address Filter Chip read enable. |
| AFC_CLK | CC to MB | Address Filter Chip read clock. |
| AFC_FFSEL | CC to MB | Address Filter Chip FIFO select.0: CAM FIFO1: Classify FIFO |
| AFC_FF# | MB to CC | Address Filter Chip Full Flag. |
| AFC_EF# | MB to CC | Address Filter Chip Empty Flag. |
| TCK | MB to CC | Boundary-scan Test-Access-Port clock. |
| TMS | MB to CC | Boundary-scan Test-Access-Port mode select. |
| TDI | MB to CC | Boundary-scan Test-Access-Port input data. |
| TDO | MB to CC | Boundary-scan Test-Access-Port output data. |
| CPGM# | MB to CC | Configuration Programming. |
| CINIT# | MB to CC | Configuration Init. |
| CCLK | MB to CC | Configuration Clock. |
| CDIN | MB to CC | Configuration data input to CC FPGA. |
| CDONE | CC to MB | Configuration done. |

The daughter card 122C includes daughter card control logic 236 and a set of co-processors 108. In one embodiment, the co-processors 108 includes two classification co-processors and eight content addressable memories ("CAM") cascaded to supply CAMs and classification banks. The daughter card control logic 236 interfaces with the DPSSRAM daughter card interface 254A, 254B and the SRAM control logic daughter card interface 252A, 252B of each secondary processing element 112A, 112B. The daughter card control logic 236 is further coupled with each of the co-processors 108 via co-processor interfaces 238. Each co-processor may further be coupled with each other in a cascaded fashion via a interco-processor interface bus (not shown). It will be appreciated that other components located on the main circuit board 202 can be moved to the daughter card 204 and vice versa depending on the implementation of the processing element 104 and the desired performance requirements.

In one embodiment, both inbound network processors 106C of each secondary processing element 112A, 112B share the same set of co-processors 108. The daughter card control logic 236 interfaces all of the co-processors 108 to both inbound network processors 106C. Alternatively, each processing element 112A, 112B may have its own set 122C of co-processors 108. For example, each secondary processing element 112A, 112B may include its own daughter card 122C. For more detail on the operation of the SRAM control logic 228, the DPSSRAM 216 and the daughter card 122C, refer to U.S. patent application entitled "APPARATUS AND METHOD FOR INTERCONNECTING A PROCESSOR TO CO-PROCESSORS USING SHARED MEMORY", referenced above.

Both network processors 106C, 106D are further coupled with an SDRAM memory fabric 118 via SDRAM interfaces 222A, 222B. In one embodiment, the SDRAM interfaces 222A, 222B are 64 bits wide and operate at a frequency of at least 100 MHz. The SDRAM memory fabric 118 includes memory banks 220A, 220B consisting of synchronous dynamic random access memory ("SDRAM") for use as working/code storage and inter-processor communications. It will be appreciated that other types of memory may also be used, such as asynchronous dynamic RAM or static RAM. Further, the SDRAM control logic 224 is also coupled with the inbound network processor's 106C SDRAM interface 222B via SDRAM control logic interface 226 and to the outbound network processor's 106D SDRAM bank 220A via a memory interface 232 which allows shared operation between the network processors 106C, 106D, described in more detail below.

Figure 3:
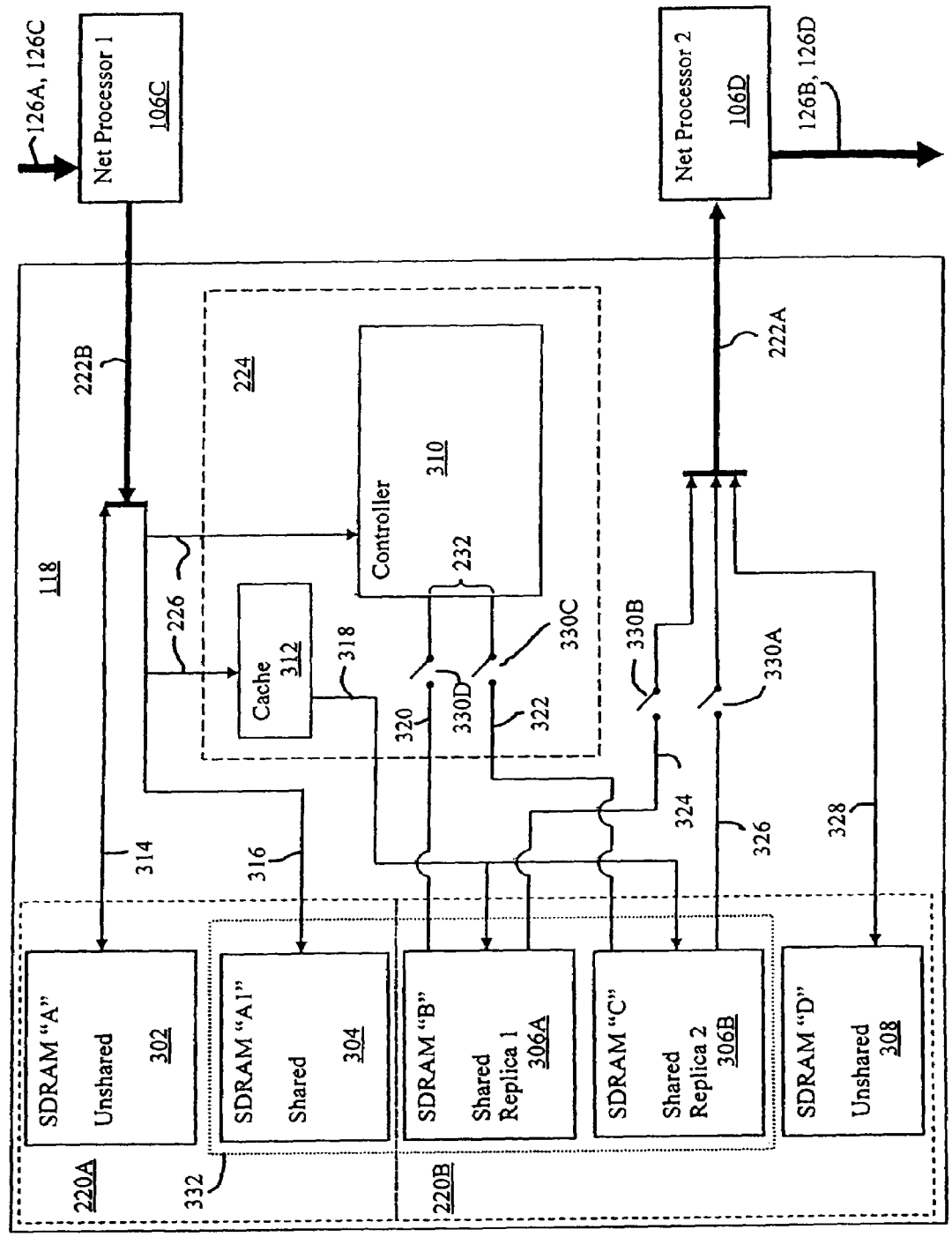
FIG. 3 depicts a detailed block diagram of an SDRAM memory fabric for use with the embodiment of FIG. 2.

FIG. 3 shows a more detailed diagram of the SDRAM memory fabric 118. The SDRAM memory fabric 118 includes an SDRAM memory 220 which is logically divided, as seen by these network processors 106C, 106D, into a portion 220A for use by the inbound network processor 106C and a portion 220B for use by the outbound network processor 106D. The SDRAM memory fabric 118 is coupled with SDRAM interfaces 222B, 222A of each network processor 106C, 106D. It will be appreciated that the protocols and operation of these interfaces 222A, 222B are dependent of the type of network processor 106C, 106D used in the particular implementation. These interfaces 222A, 222B carry both data and addressing information. As will be described below, the inbound network processor's 106C SDRAM interface 222B is coupled with inbound working storage SRAM bank 308 via the inbound unshared memory bus 314 and with the inbound shared SDRAM bank 304 via the inbound shared memory bus 316, together which form the inbound SDRAM interface 222B. The outbound network processor's 106D SDRAM interface 222A is coupled with the outbound working storage SDRAM bank 308 via the outbound unshared memory bus 328. The outbound network processor's 106D SDRAM interface bus 222A is further coupled with each replica of the outbound shared SDRAM banks 306A, 306B via the first and second outbound shared memory busses 324, 326. Together, the unshared outbound memory bus 328 and first and second outbound shared memory busses 324, 326 form the outbound SDRAM interface bus 222A.

The SDRAM memory fabric includes a bank 302, labeled "SDRAM A" of SDRAM for use as working storage which can be read from and written to by the inbound network processor 106C via inbound unshared shared memory bus 314. Typically, this memory 302 is used for operating code data storage. The SDRAM memory fabric 118 also includes a bank 308 of SDRAM, labeled "SDRAM D", for use as working storage which can be read from and written to by the outbound network processor 106D via the outbound unshared memory bus 328. As for the inbound network processor 106C, this memory 308 is typically used for operating code data storage for the outbound network processor 106D. Further, the SDRAM memory fabric 118 includes a shared memory area 332 which is used to store packet data to be shared between the two network processors 106C, 106D. The shared memory area 332 includes a bank 304 of SDRAM, labeled "SDRAM A1" which can be read from and written to by the inbound network processor 106C via the inbound shared memory bus 316 and two replicated SDRAM banks 306A, 306B, labeled "SDRAM B" and "SDRAM C", which can be read from by the outbound network processor 106D via the first and second outbound shared memory busses 324, 326, as will be described in more detail below. Each bank 302, 304, 306A, 306B, 308 includes one or more SDRAM devices. In one embodiment, the SDRAM devices include MT48LC32 M8A2TG-7E SDRAM devices manufactured by Micron Technologies, Inc., located in Boise, Id. In one embodiment, the inbound working storage bank 302 includes 192 MB of SDRAM storage, the inbound shared bank 304 includes 192 MB of SDRAM storage, the first replicated outbound shared bank 306A includes 192 MB of SDRAM storage, the second replicated outbound shared 306B bank includes 192 MB of SDRAM storage and the outbound working storage bank 308 includes 64 MB of SDRAM storage.

The SDRAM memory fabric 118 further includes the SDRAM control logic 224. The SDRAM control logic 224 includes a cache 312 and a controller 310. In one embodiment, the cache 312 is a first-in-first-out ("FIFO") queue/buffer under control of the controller 310 which queues up write data, i.e. the packet data, for writing to the replicated outbound shared memory banks 306A, 306B. The cache 312 stores both the write/packet data and address information for the write operation. In one embodiment, the cache 312 comprises two FIFO queues, one for write/packet data and the other for the corresponding write address. Further, in one embodiment, the cache 312 is implemented using three 512k×32 bit dual port static RAM's ("DPSRAM"). An exemplary DPSRAM for use with the present embodiments is the model IDT 70V35995133BF manufactured by Micron Technologies, Inc., located in Boise, Id. Alternatively, other memory types may be used to implement the cache 312. In one embodiment, the controller 310 includes a custom designed field programmable gate array ("FPGA"). An exemplary FPGA for use with the disclosed embodiments is the Xilinx® XCV300E-8FG456C Virtex™-E Field Programmable Gate Array manufactured by Xilinx corporation, located in San Jose, Calif. Alternatively, other forms of custom logic devices may be used including an appropriately programmed general processing device.

In general, the SDRAM memory fabric 118 permits the network processors 106C, 106D to share a segment of common SDRAM memory space 332 with each network processor 106C, 106D assuming that it has full control over the entire shared memory space 332 at all times. Each network processor 106C, 106D is capable of both reading and writing to the entire SDRAM memory 220. However, the operation of the network processors 106C, 106D and the operation of the SDRAM control logic 224 restricts the inbound network processor 106C to exclusively writing data to the shared SDRAM memory area 332 and restricts the outbound network processor 106D to exclusively reading data from the shared SDRAM memory area 332. In this way, the two network processors 106C, 106D, each operating uni-directionally, together operate bi-directionally.

When the inbound network processor 106C completes its processing of a packet, it writes that packet, as well as any processing results, to the inbound shared memory bank 304. The SDRAM controller 224 sees the write by the inbound network processor 106C and mirrors the write into the first and second replicated outbound shared memory banks 306A, 306B for access by the outbound network processor 106D. Two replicated outbound shared memory banks 306A, 306B are provided to allow the SDRAM control logic 224 to replicate the write data without impeding the outbound network processor's 106D ability to read data from the shared memory area 332. When the SDRAM control logic 224 needs to write data to the replicated outbound shared memory banks 306A, 306B, the logic 224 first determines if either bank is currently being read from by the outbound network processor 106D. If one of the banks 306A, 306B is in use, the SDRAM control logic 224 will write the data to the free bank 306A, 306B and then write the data to the other bank 306A, 306B when it becomes available. The outbound network processor 106D is always connected to one of the two replicated outbound shared memory banks 306A, 306B and can read from the connected bank 306A, 306B at any time. In this way, the first and second replicated outbound shared memory banks 306A, 306B are kept synchronized/mirrored in a ping-pong fashion. Further, both the inbound and outbound network processor's 106C, 106D ability to access the memory is unimpeded. Once the packet data is written to one of the outbound shared memory banks 306A, 306B, it is available for processing by the outbound network processor 106D.

For example, where the outbound network processor 106D is currently performing a read operation from the second replicated outbound shared memory bank 306B, the inbound network processor 106C can initiate a write operation to the shared inbound memory bank 304. The SDRAM control logic 224 captures the write to the cache 312. Since the second replicated outbound shared memory bank 306B is in use by the outbound network processor 106D, the SDRAM control logic 224 writes the data to the first replicated outbound shared memory bank 306A. Note that the write data is maintained in the cache 312. Once the outbound network processor 106D completes its read operation from the second replicated outbound shared memory bank 306B, the SDRAM control logic 224 switches it to read from the first replicated outbound shared memory bank 306A. The outbound network processor 106D is unaware of this switch. If it attempts to perform a read operation at this time, it will read from the first replicated outbound shared memory bank 306A. The SDRAM control logic 224 then completes the mirroring operation and writes the write data into the second replicated outbound shared memory bank 306B. The write data may then be flushed/overwritten in the cache 312.

While the previous packet data flow discussion is informative, there are other System-Level issues that also require continual maintenance in addition to processing the Packet Data.

As mentioned in the previous section, the SDRAM control logic 224 controller 310 performs the switching of outbound network processor 106D control between the first replicated outbound shared memory bank 306A and the second replicated outbound shared memory bank 306D. In addition, outbound network processor 106D has full control of the outbound working storage bank 308 at all times. As such, the SDRAM control logic 224 must monitor all outbound network processor 106D SDRAM accesses and steer commands and data to their correct locations. This means that the SDRAM control logic 224 must actually perform the switching of outbound network processor 106D control between the first replicated outbound shared memory bank 306A, the second replicated outbound shared memory bank 306D and the outbound working storage bank 308.

Typically, at any given time outbound network processor 106D will be in control of one replicated outbound shared memory bank 306A, 306B and the SDRAM Control Logic 224 controller 310 will be in control of the other replicated outbound shared memory bank 306A, 306B. During the time between successive replicated outbound shared memory bank 306A, 306B switches, the outbound network processor 106D may issue SDRAM Active, Pre-charge or Refresh commands to the replicated outbound shared memory bank 306A, 306B that it is currently controlling. The SDRAM control logic 224 must track these commands, and duplicate them in the other replicated outbound shared memory bank 306A, 306B before the next switch may take place. This ensures that both first and second replicated outbound shared memory banks 306A, 306B are properly synchronized before the next switch is made.

Figure 5:
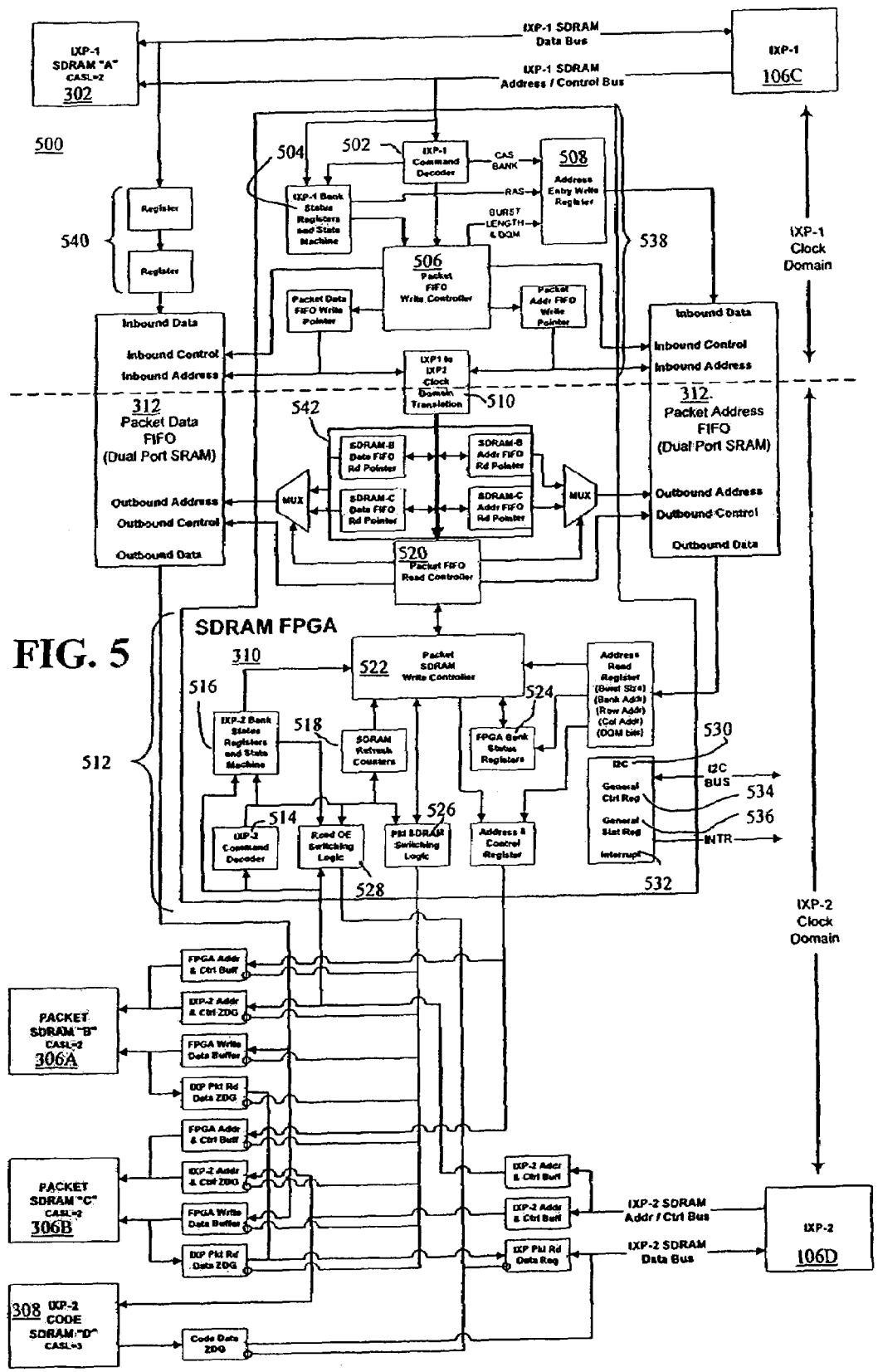
FIG. 5 depicts a more detailed block diagram of the memory fabric of FIG. 3.

The inbound network processor 106C processor and the outbound network processor 106D processor are each running on their own independent clocks. Even though they both use the same frequency setting for their clock, and they both have an SDRAM clock frequency of 100 MHz, as described above, the clocks are asynchronous with respect to each other. As a result, one of the functions of the SDRAM control logic 224 is to provide an interface between these two asynchronous systems. The SDRAM control logic 224 uses the cache 312 and the SDRAM Control Logic 224 controller 310 as the system clock boundary. Referring to FIG. 5, careful design techniques are employed at this clock boundary to prevent meta-stability from occurring in any data, address or control signal.

In addition, the SDRAM control logic 224 must address the handling of system boot-up. Normally in the course of booting-up, the network processor 106C, 106D would initialize and set the mode register of any SDRAM that was connected to it. This is how the inbound network processor 106C configures the inbound working storage bank 302. However, it is a bit more complicated for the outbound network processor 106D and replicated outbound shared memory banks 306A, 306B and outbound working storage bank 308. The outbound network processor 106D is in charge of initialization for these three banks 306A, 306B, 308. Before the outbound network processor 106D may communicate with them, it must first initialize the SDRAM control logic 224, which includes configuring the SDRAM Control Logic 224 controller 310. Once the controller 310 is configured, the outbound network processor 106D may then initialize and set the mode registers of these three banks 306A, 306B, 308. Unfortunately, the replicated outbound shared memory banks 306A, 306B and outbound working storage bank 308 each require a slightly different mode register setting. To solve this, the SDRAM Control Logic 224 controller 310 intercepts the mode register setting command from the outbound network processor 106D, modifies it slightly, and then issues it to the first and second replicated outbound shared memory banks 306A, 306B.

In order for the SDRAM fabric 118 to function properly, the following limitations must be adhered to:

The packet data memory, i.e. the replicated outbound shared memory banks 306A, 306B, is located in the lower 192 Mbytes of address space;

The code data memory, i.e. the inbound and outbound working storage banks 302, 308, is located in the upper 64 Mbytes of address space;

The inbound and outbound network processors 106C, 106D do not share code data memory space;

The inbound and outbound network processors 106C, 106D may freely read or write in their code data memory space;

The inbound and outbound network processors 106C, 106D share the packet data memory space;

The inbound network processor 106C may freely read or write in Packet Data memory space. However, if the inbound network processor 106C reads from Packet Data memory space, it will actually read from its own inbound shared bank 304, SDRAM A1;

The outbound network processor 106D may only read in Packet Data memory space (no writes). If the outbound network processor 106D inadvertently writes to the Packet Data memory space, the data will be discarded;

Software algorithms must allow enough latency between a specific inbound network processor 106C Packet Data write operation and a corresponding outbound network processor 106D Packet Data read operation such that the SDRAM control logic 224 has enough time to mirror that data in both SDRAM memories;

Software algorithms must ensure that the inbound network processor 106C maintains a maximum write Packet Data bandwidth of no more than 50% of the full SDRAM memory bandwidth over time so as to not overflow the FIFO queue/cache 312; and All SDRAM control logic 224 components must use a Data Burst Length setting of 8 Quad-Words for optimal bandwidth, however other burst lengths may be used.

The following definitions will be useful in understanding the remaining figures:

| | |
|---|---|
| CAS | Column Address Strobe; |
| CASL | Column Address Strobe Latency; |
| RAS | Row Address Strobe; |
| MUX | Multiplexer; |
| ZDG | Zero Delay Gate (a ZDG is a logic gate/switch with a low "switch on" time (within the same clock cycle as the switch command, hence "zero delay") to avoid latency (delay) for data transfers. It is essentially, a very fast switch; |
| Bit | One "Bit" is a single binary digit; |
| Byte | 8-bit data width; |
| Word | Word (16-bit/2-byte data width); |
| DWord | Double Word (32-bit/4-byte data width); |
| QWord | Quad Word (64-bit/8-byte data width). |

Figure 4:
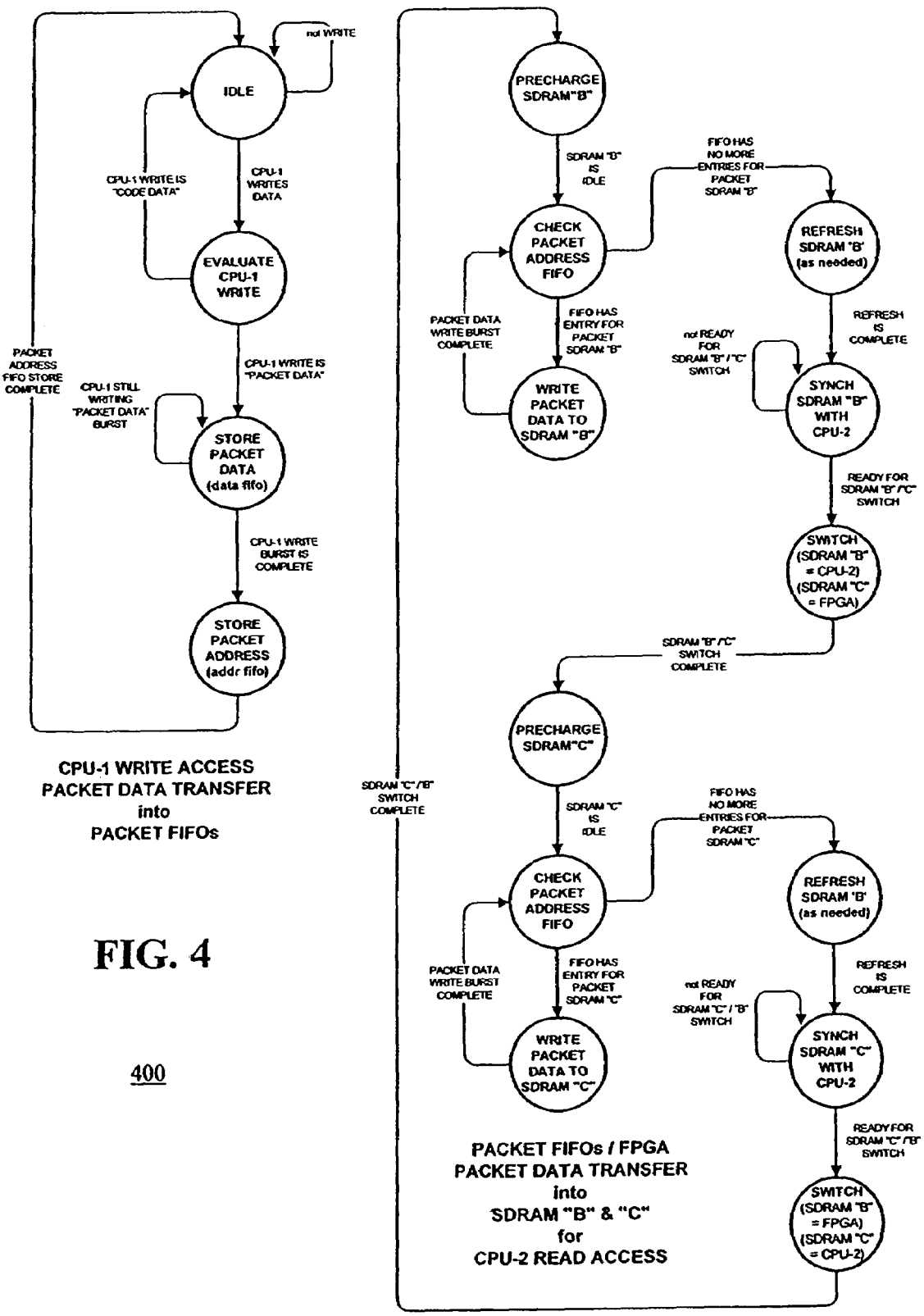
FIG. 4 depicts a state diagram detailing operation of the memory fabric of FIG. 3.

FIG. 4 shows a state diagram 400 which details the flow of data and control for the SDRAM fabric 118 as implemented by the SDRAM control logic 224. In the figure, "CPU-1" refers to the inbound network processor 106C and "CPU-2" refers to the outbound network processor 106D. "FPGA" refers to the SDRAM control logic 224 controller 310. "Data FIFO" and "ADDRESS FIFO" refer to the cache 312. Two processes of the SDRAM control logic 224 are shown in FIG. 4, namely a CPU-1 write access packet data transfer into packet FIFOs, and packet FIFOs/FGPA packet data transfer into SDRAM "B" and "C" for CPU-2 read access. With regard to a CPU-1 write access packet data transfer into packet FIFOs process, the SDRAM control logic 224 begins in an idle state, and remains there as long as CPU-1 does 'not WRITE'. If CPU-1 writes data, SDRAM control logic 224 evaluates the CPU-1 write. If the CPU-1 write is for "CODE DATA", the SDRAM control logic 224 returns to the idle state. If the CPU-1 write is for "PACKET DATA", the SDRAM control logic 224 moves to a store packet data (data FIFO) state. Note, that if CPU-1 is still writing in a "PACKET DATA" burst, the SDRAM control logic 224 will remain in this state. Once the CPU-1 write burst is complete, the SDRAM control logic 224 enters a store packet address (addr FIFO), wherein the packet address is stored into a packet FIFO. Once the packet address FIFO store is complete, the SDRAM control logic 224 returns to the idle state. With regard to the packet FIFOs/FGPA packet data transfer into SDRAM "B" and "C" for CPU-2 read access process, the SDRAM control logic 224 begins in a precharge SDRAM B state. If SDRAM "B" is idle, the SDRAM control logic 224 checks the packet address FIFO. If the FIFO has an entry for packet SDRAM "B", the SDRAM control logic 224 write the packet data to the SDRAM "B". Once the packet data write burst is complete, the SDRAM control logic 224 returns to check the packet address FIFO. When the FIFO has no more entries for packet SDRAM "B", the SDRAM control logic 224 refreshes SDRAM "B". When the refresh is complete, the SDRAM control logic 224 synchronizes SDRAM "B" with CPU-2. The SDRAM control logic 224 remains in this state as long as the system is not ready for a switch between SDRAM "B" and SDRAM "C". When the system is ready for the switch between SDRAM "B" and SDRAM "C", the SDRAM control logic 224 couples SDRAM "B" to CPU-2 and SDRAM "C" to the FPGA. SDRAM control logic 224 then uses similar processes to transfer packet data into SDRAM "C".

The SDRAM Control Logic 118 controller 310 is a key piece of the SDRAM control logic 118 that provides the data pump and control logic to keep both memories 304, 306A, 306B mirrored and serviced, as well as providing both network processors 106C, 106D with constant access to the shared memory 332. The controller 310 consists of two major sections split on clock boundaries. These are the inbound network processor 106C and outbound network processor 106D Data Controller sections. Refer to FIG. 5. Some of the functions of the controller 310 include:

Selecting the correct data (i.e. "packet" data) from inbound network processor 106C to store in the shared memory 332;

Maintaining inbound network processor 106C packet data in the cache 312 during the mirroring process;

Maintaining inbound network processor 106C packet address in the cache 312 during the mirroring process Maintaining data synchronization between the two memories 304 and 306A, 306B (mirror)

Maintaining command synchronization between the two memories 304 and 306A, 306B

Arbitrating the Ping-Pong switching between the two memories 306A, 306B;

Interfacing between two asynchronous clock domains (inbound network processor 106C & outbound network processor 106D clock domains);

Controlling the outbound network processor 106D access between packet SDRAM 306A, 306B and code SDRAM 308;

Resetting the SDRAM control logic 118;

Configuring the Packet SDRAM during boot-up; and

Duplicating the outbound network processor's 106D SDRAM Active, Pre-charge and Refresh commands.

FIG. 5 depicts a more detailed block diagram 500 of the memory fabric 118 of FIG. 3. The main components will be discussed below.

The primary function of the inbound network processor 106C Data Controller 538 is to monitor the inbound network processor 106C SDRAM control & address bus 222B in search of Packet Data writes. If a Packet Data write is detected, the inbound network processor 106C Data Controller 538 copies the data and address information of that write into the Packet Data FIFO (cache) 312 and Packet Address FIFO (cache) 312. The data stored in the two FIFO's/cache 312 will later be used by the outbound network processor 106D Data Controller 512 when it moves that data into first replicated outbound shared memory bank 306A and second replicated outbound shared memory bank 306B. Packet Data is defined as any data residing in the lower 192 megabyte address space of SDRAM memory.

The inbound network processor 106C Command Decoder 502 monitors the inbound network processor 106C SDRAM bus 222B for valid SDRAM commands. Refer to the Micron MT48LC32M8A2 SDRAM Data Sheet (revision B), published by Micron Technologies, Inc., located in Boise, Id., for a detailed description of each of these commands. The decoded SDRAM commands are:

No Operation;
Active;
Pre-charge;
Read;
Write;
Burst Terminate;
DQM (data mask);
(Auto Refresh and Load Mode Register commands are ignored).

The inbound network processor 106C Bank Status Register & State Machine 504 monitors the inbound network processor 106C Command Decoder 502 and the inbound network processor 106C Bank & Row Address (from the address portion of the bus 222B) in order to track each Bank's "Active" or "Idle" state. If a Bank has just been made "Active", it also stores that Bank's Row Address, and checks the Row Address to determine whether it is a "Code" or "Packet" Data Block. The row address is 13 bits.

Figure 6:
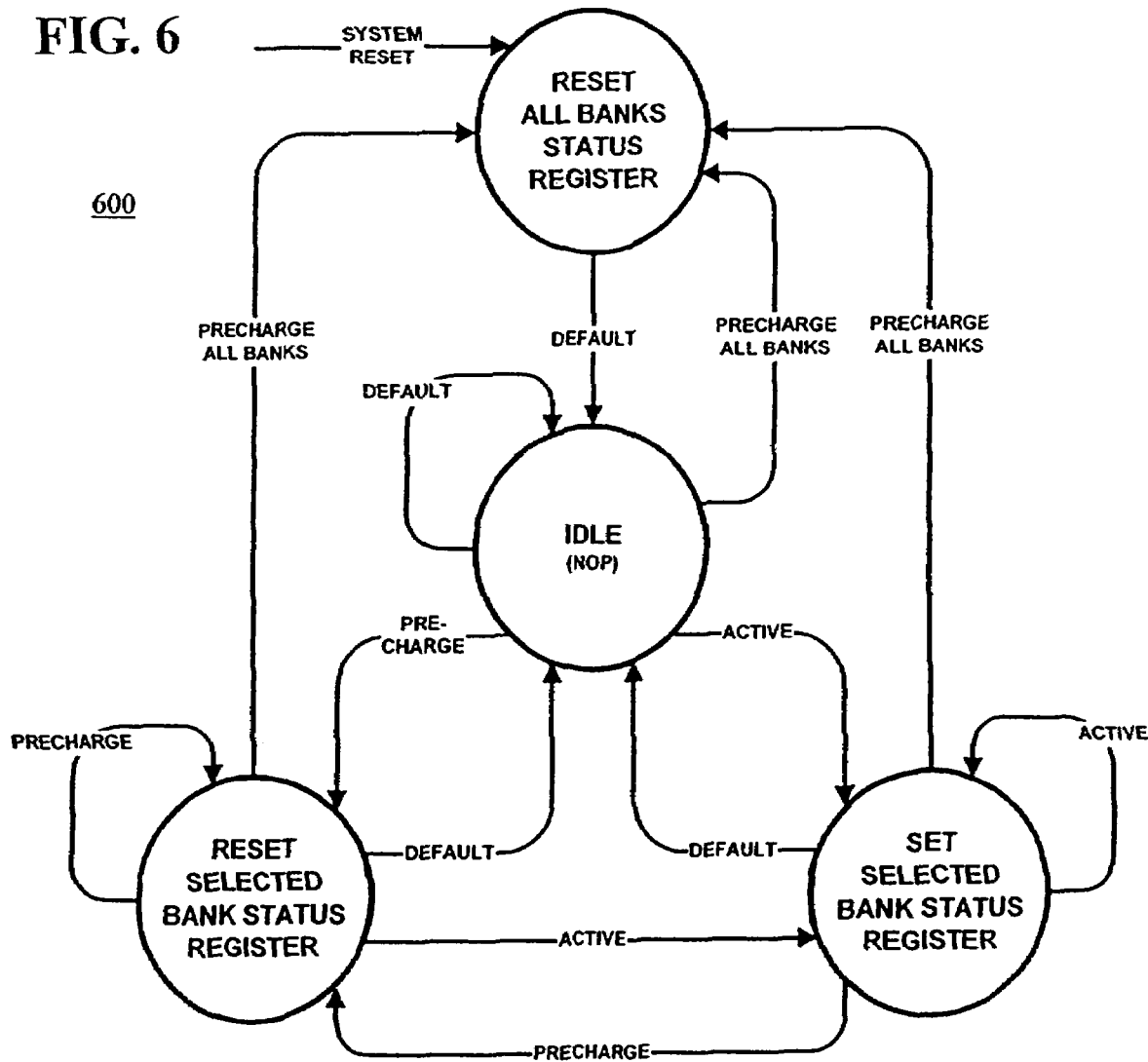
FIG. 6 depicts a state diagram of the bank status register state machine for use with the embodiment of FIG. 5.

The inbound network processor 106C Bank State Machine 504 defines the control logic used to resolve the various inbound network processor 106C SDRAM bus transactions, and then to set or reset the appropriate Bank Status Register locations. FIG. 6 depicts a state diagram 600 of the bank status register state machine. As shown, the system can enter any state from any other state, depending on the transaction. All Banks Status Registers are reset on either a system reset or a precharge all Banks transaction. On a default transaction, the system then goes to an idle state, wherein no operation ("NOP") is performed. On a pre-charge transaction for a selected Bank, the selected Bank Status Register is reset. If an active transaction is issued for a selected Bank, the selected Bank Status Register is set The inbound network processor 106C Packet FIFO Write Controller 506 monitors the inbound network processor 106C Command Decoder 502 and the inbound network processor 106C Bank Status Register 504 in order to determine when an inbound network processor 106C data write to an SDRAM Packet Memory Block occurs. When one occurs, the Packet Data and Address must be copied into the Packet Data FIFO and Packet Address FIFO 312.

The inbound network processor 106C SDRAM Data Bus 222B has a 2-register pipeline 540 before the Packet Data FIFO. This pipeline 540 gives the controller 310 one clock cycle to determine if a Packet Data write is in process before it must initiate a Packet Data FIFO 312 write. Reference will be made hereinafter to both cache 312 and FIFO (or FIFO's) 312. Once a Packet Data FIFO 312 write starts, the Write Controller 506 continues to monitor the Command Decoder 502 and Bank Status Register 504 to determine if DQM (data mask) has been asserted on any cycle, and when the Write burst is complete. When the burst is complete, the Write Controller 506 halts the Packet Data FIFO 312, sends DQM information and the burst length to the Address Entry Write Register 508. The full address information is then written in the Packet Address FIFO 312.

Figure 7:
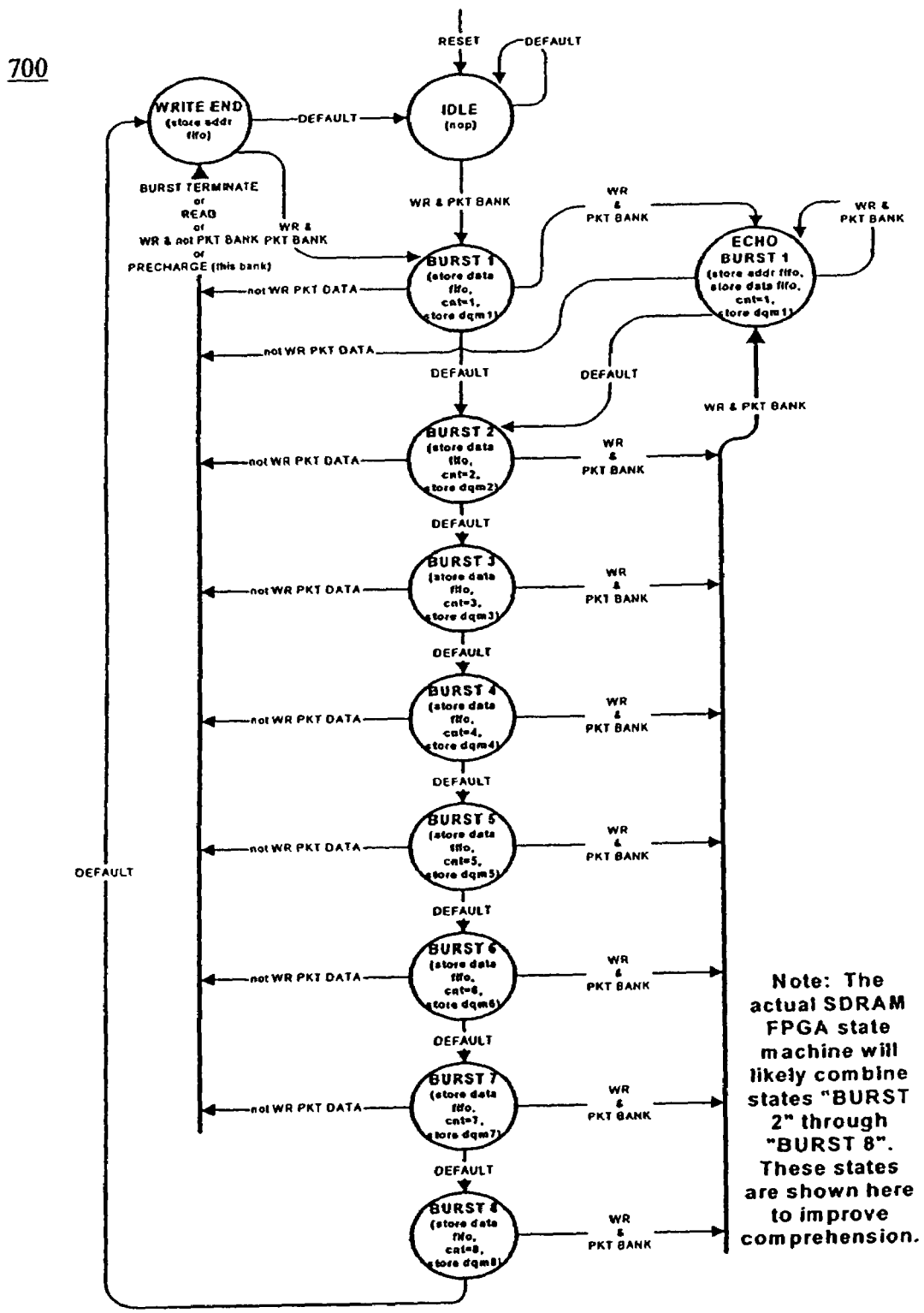
FIG. 7 depicts a state diagram of the packet FIFO write controller state machine for use with the embodiment of FIG. 5.

The Packet FIFO Write Controller 506 State Machine defines the control logic used to resolve the various inbound network processor 106C SDRAM bus 222B transactions, and then move the Packet Data and Address into the appropriate FIFOs 312 during a Packet Data Write. FIG. 7 depicts a state diagram 700 of the packet FIFO write controller 506 state machine. On a system reset, the packet FIFO write controller 506 enters an idle state. On a 'wr & pkt bank' transaction, the packet FIFO write controller 506 enters a burst 1 state, wherein the packet FIFO write controller 506 write the Packet Data into the FIFO 312. The packet FIFO write controller 506 then continues through burst states 2 through 8, acting in a similar fashion. After reaching burst state 8, the packet FIFO write controller 506 enters a write end state, wherein the Address is stored in the appropriate FIFO. The packet FIFO write controller 506 the returns to the idle state. If a 'wr & pkt bank' transaction is present when in any of the burst states, the packet FIFO write controller 506 enters an echo burst state, wherein the Packet Data and Address information is moved into the appropriate FIFO. If a 'not wr & pkt bank' transaction is present, when in any of the burst states, the packet FIFO write controller 506 enters the write end state.

The Address Entry Write Register 508 collects and formats the Packet SDRAM Address and Control information before it is written in the Packet Address FIFO 312. The Row Address is from the Bank Status Register 504. The Column Address and Bank Address are from the Command Decoder 502. The Burst Length and DQM (Data Mask) bits are from the FIFO Write Controller 506. Refer to the following table for the Packet Address FIFO data format:

| Bit Name | Bit Location |
| --- | --- |
| DQM | AddrFifo[35:28] |
| Burst Length | AddrFifo[27:25] |
| Bank Address | AddrFifo[24:23] |
| Row Address | AddrFifo[22:10] |
| Column Address | AddrFifo[9:0] |

The controller 310 includes clock domain translation logic 510. The inbound network processor 106C processor and the outbound network processor 106D processor are each running on their own independent clocks. Even though they both use the same frequency setting for their clock, and they both have an SDRAM clock frequency of 100 MHz, the clocks are asynchronous with respect to each other. As a result, one of the functions of the SDRAM control logic 124 is to provide an interface between these two asynchronous systems. The SDRAM memory fabric 118 uses the Packet Data FIFO 312, the SDRAM Control Logic 124 controller 310 and the Packet Address FIFO 312 as the system clock boundary. Refer to FIG. 5. The design employed at this clock boundary prevents meta-stability from occurring in any data, address or control signal.

Within the controller 310, the inbound network processor 106C Data Controller 538 is in the inbound network processor 106C clock domain, and the outbound network processor 106D Data Controller 512 is in the outbound network processor 106D clock domain. The controller 310 employs an "inbound network processor 106C to outbound network processor 106D Clock Domain Translator" block 510 for any signals or data that must pass from one clock domain and into the other. The primary signals that must pass between clock domains are:

Global Warn-Reset;
Packet Data FIFO Write Address Pointer;
Packet Address FIFO Write Address Pointer.

Global Warm-Reset is a single signal that is generated in the outbound network processor 106D Data Controller 512 section and passes from the outbound network processor 106D to the inbound network processor 106C clock domain. Several inbound network processor 106C clock re-synchronization registers (not shown) are employed on this signal to avoid meta-stability in the inbound network processor 106C domain.

The Packet Address and Data FIFO Write Address Pointers are a bit more complex. These Address Pointers are generated in the inbound network processor 106C Data Controller 538 section, and passed from the inbound network processor 106C to the outbound network processor 106D clock domain. The Address Pointers consist of many bits of data that all must arrive in the outbound network processor 106D clock domain at the same time (i.e. on the same outbound network processor 106D clock edge). However, if re-synchronization registers are simply used (as for the Global Warm-Reset), meta-stability concerns would occasionally cause some of the Address Pointer bits to arrive on one outbound network processor 106D clock edge, while some other bits would arrive on one clock edge (or very rarely two clock edges) later. This may cause the system to lose synchronization.

To alleviate this condition, the Clock Domain Translator places the Address Pointers into a dual-port memory 542, and then passes a single signal from the inbound network processor 106C clock domain to the outbound network processor 106D clock domain that indicates the Address Pointer is ready to be read by the outbound network processor 106D Data Controller section. This signal passes through several outbound network processor 106D clock re-synchronization registers (not shown) to avoid meta-stability in the outbound network processor 106D domain. Once the signal is received by the outbound network processor 106D Data Controller, the Address Pointers are fetched from dual port memory 542 and used for further processing.

The primary function of the outbound network processor 106D Data Controller 512 is to monitor the Packet Address FIFO 312 for queued packet data bursts, and then to write those data bursts into both first and second replicated outbound shared memory banks 306A, 306B, completing the data mirror. To achieve this goal, the outbound network processor 106D Data Controller 512 must also perform numerous sub-functions including maintaining outbound network processor 106D command synchronization and arbitrating the Ping-Pong switching between the two Packet SDRAM's 306A, 306B. The outbound network processor 106D Data Controller 512 also switches between Packet SDRAM 306A, 306B and Code SDRAM 308 during read operations, and handles system warm-reset and boot-up.

The outbound network processor 106D Command Decoder 514 monitors the outbound network processor 106D SDRAM bus 222A for valid SDRAM commands. Refer to the Micron MT48LC32M8A2 SDRAM Data Sheet (revision B), published by Micron Technologies, Inc., located in Boise, Id., for a detailed description of each of these commands. The decoded SDRAM commands are:

No Operation;
Active;
Pre-charge;
Read;
Write;
Burst Terminate;
Auto Refresh;
Load Mode Register;
DQM (data mask).

The outbound network processor 106D Bank Status Register & State Machine 516 monitors the outbound network processor 106D Command Decoder 514 and the outbound network processor 106D Bank & Row Address in order to track each Bank's "Active" or "Idle" state. If a Bank has just been made "Active", it also stores that Bank's Row Address, and checks the Row Address to determine whether it is a "Code" or "Packet" Data Block. The outbound network processor 106D Bank Status Register 516 uses the same data format as the inbound network processor 106C Bank Status Register 504.

The outbound network processor 106D Bank State Machine 516 defines the control logic used to resolve the various outbound network processor 106D SDRAM bus transactions, and then to set or reset the appropriate Bank Status Register 524 locations. The outbound network processor 106D Bank State Machine 516 uses the same logic algorithm as the inbound network processor 106C Bank State Machine 600, shown in FIG. 6.

The outbound network processor 106D Packet SDRAM Refresh Request Counter 518 monitors the outbound network processor 106D Command Decoder 514 in order to track any Auto Refresh commands issued by the outbound network processor 106D. If the outbound network processor 106D issues a Refresh Command when the Packet SDRAM Write Controller 522 is currently accessing one of the Packet SDRAM's 306A, 306B (SDRAM "B" or "C") the Write Controller 522 must ensure that an Auto Refresh cycle is sent to that Packet SDRAM 306A, 306B as well.

The Packet SDRAM Write Controller 522 issues its Auto Refresh commands just prior to a SDRAM switch command when all the SDRAM banks are in the Idle state. Because of this, several Auto Refresh commands may have been counted since the last SDRAM switch, and a Refresh Request Counter keeps track of the number of these commands.

Figure 8:
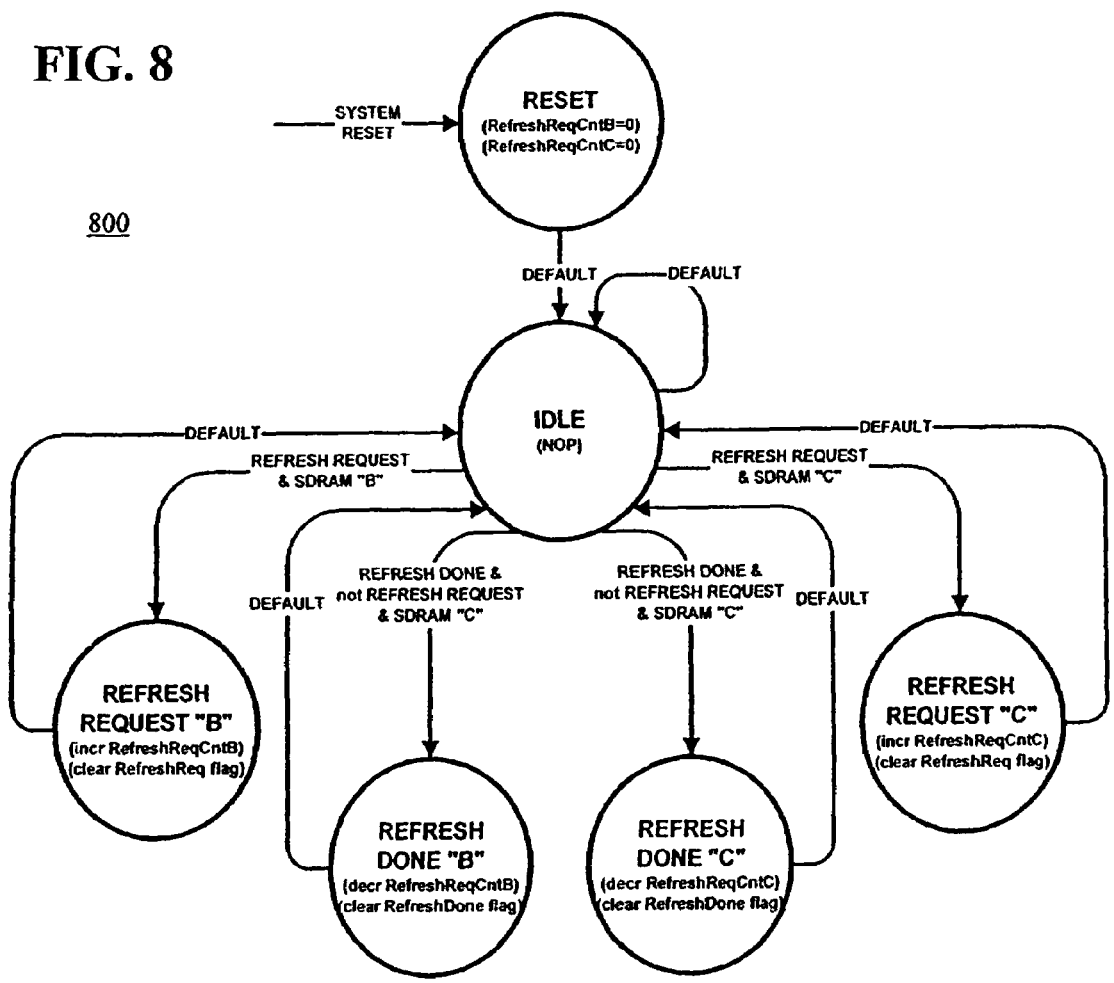
FIG. 8 depicts a state diagram of the outbound network processor refresh request state machine for use with the embodiment of FIG. 5.

Just prior to the Packet SDRAM Switch there is a several clock window where another Auto Refresh command could be received from the outbound network processor 106D, but it would be too late to be reissued to the SDRAM by the Packet Write Controller 522. In this case, the Refresh command would be memorized and issued to that same Packet SDRAM 306A, 306B the next time its control is switched back to the Packet SDRAM Write Controller 522. There are two Refresh Request counters in order to keep track of Refresh commands for both replicated outbound shared memory banks 306A, 306B. FIG. 8 depicts a state diagram 800 of the outbound network processor refresh request state machine 518. On a system reset, the outbound network processor refresh request state machine 518 enters a reset state, wherein the RefreshReqCntB variable and RefreshReqCntC are set to 0. By default, the system enters an idle state, wherein no operations are performed. On a refresh request, the system increments the appropriate count. On a refresh done, the system decreases the appropriate count.

The Packet FIFO Read Controller 520 monitors all the Write Pointers & Read Pointers for both the Packet Data and Address FIFO's 312, processes FIFO read requests from and provides status to the Packet SDRAM Write Controller 522 and drives the "read" control port of the FIFO's 312 Dual Port SRAM's. A list of the functions the FIFO Read Controller 520 performs follows:
   Track the Packet Data FIFO Write Pointer;
   Track the Packet Address FIFO Write Pointer;
   Control the SDRAM "B" 306A Packet Data FIFO Read Pointer;
   Control the SDRAM "C" 306B Packet Data FIFO Read Pointer;
   Control the SDRAM "B" 306A Packet Address FIFO Read Pointer;
   Control the SDRAM "C" 306B Packet Address FIFO Read Pointer;
   Process Packet Data FIFO Read Requests from the Packet SDRAM Write Controller 522;
   Process Packet Address FIFO Read Requests from the Packet SDRAM Write Controller 522;
   Provide Packet FIFO status to the Packet SDRAM Write Controller 522 (including FIFO Empty, 25%, 50%, 75%, 90% & Full flags, FIFO Underflow & Overflow flags).

The Controller 310 Packet SDRAM Write Controller 522 is the heart of the outbound network processor 106D Data Controller circuit 512. It is responsible for moving Packet Data out from the Packet Data & Address FIFO's 312 and into Packet SDRAM's "B" & "C" 306A, 306B. It monitors status from and sends commands to numerous modules in the outbound network processor 106D Data Controller circuit 512 to perform this function. The Controller 310 Packet SDRAM Write Controller 522 State Machine defines the control logic used in this module.

The Controller 310 Packet SDRAM Write Controller 522 goes into action right after it receives confirmation of a successful replicated outbound shared memory bank 306A, 306B switch from the Switching Logic circuit 526. Once the switch is confirmed, the Write Controller 522 performs a Pre-charge All command in order to Idle all Active SDRAM Banks. If the Packet Address FIFO 312 is not empty, the Write Controller 522 fetches the next FIFO 312 entry. If the Bank and Row Address of the fetched address are currently Active, a Write Command is issued. If the Bank and Row Address are either Idle or set to a different address, then the appropriate Pre-charge and Active Commands are issued by the Write Controller 522, followed by the Write Command.

When the Packet SDRAM Write Controller 522 issues a SDRAM Write Command, it checks the Burst Length for this write sequence. If the Burst Length is only 1 Quad Word, then a Burst Terminate Command is issued on the next cycle. If the burst length is more than 1 Quad Word, then the Write Controller 522 continues to push out write data on each clock. When the number of Quad Words sent matches the Burst Length, but is not a full length burst (less than 8 Quad Words), then a Burst Terminate Command is issued on the next cycle. If a full-length burst (8 Quad Words) was sent, then the write sequence is complete, and the Write Controller 522 goes onto the next state. Please note that since the SDRAM control logic 124 is set to use a burst size of 8, then any smaller burst sizes must be truncated by a Burst Terminate Command.

Once the write burst is complete the Write Controller 522 checks to see if there are other entries in the Packet Address FIFO 312, and if the maximum number of writes (256 bursts) has been processed. If the FIFO 312 has more entries and the write counter has not exceeded its maximum, then the next address is fetched, and another write burst initiated. If the FIFO 312 is empty or 256 write bursts have been processed, then the Write Controller 522 stops performing writes, and prepares the Packet SDRAM 306A, 306B to switch back to outbound network processor 106D control.

To prepare for the SDRAM Switch, the Write Controller 522 first issues a Pre-charge All command to the SDRAM, to put all banks in an Idle state. Then the Write Controller 522 checks if any Refresh Commands have been received from outbound network processor 106D, and it issues the same number of Refresh Commands to the SDRAM. Next, the Write Controller 522 checks the outbound network processor 106D Bank Status Register 524, and sets each of the SDRAM Banks to match the Idle, Active and Row Address parameters of the Status Register 524. If the Status Register 524 changes during this process (due to an outbound network processor 106D Active or Pre-charge Command being issued), the Write Controller 522 will duplicate those changes before moving to the next step.

The final step is for the Write Controller 522 to send a request to the Switch Logic 526 to perform the Packet SDRAM Switch. There is a small 2-clock period just before the Switch Logic 526 issues a Bridge Command where outbound network processor 106D could issue another Pre-charge or Active Command. If this occurs, the switch must be aborted, and control given back to the Write Controller 522 so that it may again re-synchronize the SDRAM Banks with the outbound network processor 106D Bank Status Register 524. After the SDRAM Banks 306A, 306B are synchronized, a switch may be reinitiated.

During system boot-up (or warm-reset) the Write Controller 522 performs some special functions. Right after boot-up, the Switching Logic 526 bridges both SDRAM's "B" & "C" 306A, 306B to the SDRAM Control Logic 124 controller 310. The controller 310 has full control over these 2 SDRAM's 306A, 306B. The Write Controller 522 monitors outbound network processor 106D SDRAM boot-up commands (Pre-charge and Refresh), and mimics those commands to the SDRAM's 306A, 306B. When the Write Controller 522 sees outbound network processor 106D issue the "Set SDRAM Mode Register" command, it modifies that command before sending it on to the SDRAM's 306A, 306B. The Code SDRAM has a CAS Latency set to 3, while the Packet SDRAM's need a CAS Latency set to 2. The Write Controller 522 makes this change and then sets the Packet SDRAM Mode Registers. After the Mode is set, two Refresh Commands are issued to the SDRAM's 306A, 306B (per the SDRAM specification), and then the Write Controller 522 commands the Switching Logic 526 to "Break the Controller 310/SDRAM Bridge", and commence normal operations. The only way to repeat this process once normal operations have started is to issue a "Warm-Reset" command to the Controller 310 via the I2C interface. This will halt all Controller 310 operations, purge all FIFO's 312, and put the Controller 310 in a "just woke up" state.

The Controller 310 Packet SDRAM Write Controller 522 supports the following SDRAM commands:
   No Operation;
   Active;
   Pre-charge;
   Write;
   Burst Terminate;
   Auto Refresh;
   DQM (data mask);
   Load Mode Register (only supported immediately after Warm-Reset);
   (Read is not supported).

Figure 9:
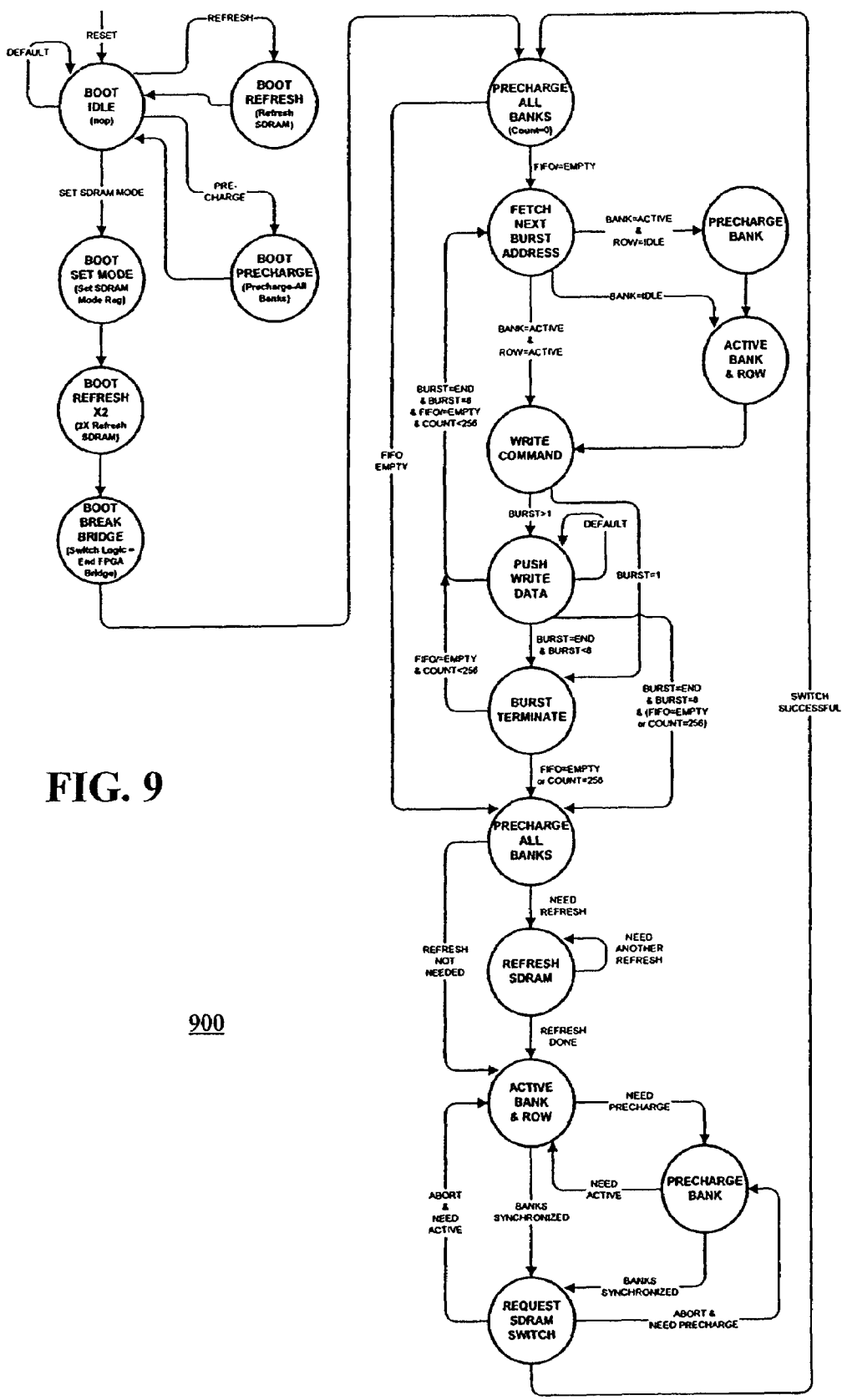
FIG. 9 depicts a state diagram of the packet SDRAM write controller state machine for use with the embodiment of FIG. 5.

FIG. 9 depicts a state diagram 900 of the packet SDRAM write controller 522 state machine. The Write Controller 522 State Machine shown in the figure is single-threaded, performing only one command during any given state. This "single-thread" version of the state machine meets the 100 MHz system clock requirements. Following a system reset, the Write Controller 522 enters an idle state. From the idle state, three commands may be issued. Following a refresh command, the Write Controller 522 refreshes the SDRAM. Following a pre-charge command, the Write Controller 522 precharges all banks. Following a set SDRAM mode command, the Write Controller 522 sets the SDRAM mode register, refreshes the SDRAM twice, sets the switch logic to the end FPGA bridge, and finally precharges all banks. At this point and if the FIFO 312 is not empty, the Write Controller 522 will fetch the next burst address. If the fetched bank is active, but the row is idle, the Write Controller 522 precharges the bank and activates the bank and row. If the bank is idle, the Write Controller 522 only activates the bank and row. If both the bank and row are active, the Write Controller 522 writes the data in a burst. If the burst is for multiple write commands, the Write Controller 522 will continue to push write data to the SDRAM at the fetched address until the burst is done. Following the completion of the burst, the Write Controller 522 will continue to fetch addresses and write data to the SDRAM until the FIFO is empty or the bank is full. Once either of these conditions is met, the Write Controller 522 precharges all banks and refreshes the SDRAM. Next, the Write Controller 522 continuously activates the bank and row and precharges the banks as needed until the banks are synchronized, at which point the Write Controller 522 switches between the SDRAMs.

Alternatively, a "multi-thread" version of the state machine 900 of FIG. 9 could be used to yield improved system performance. The improved performance would be especially noticeable when most of the Packet Data bursts are 8 Quad Words in length. The "multi-thread" state machine would take advantage of SDRAM Command interleaving. During a particular Packet Data burst, it would pre-fetch the next address information in the Packet Address FIFO. It would then check to see if that SDRAM Bank & Row are currently Active. If the correct Bank & Row were not Active, then it would Pre-charge that Bank (assuming it isn't the bank we are currently writing to), and Activate the correct Row in that Bank. With this technique, the SDRAM will be ready to start the next Packet Data burst write right after the current one is completed.

The Controller 310 Packet SDRAM Bank Status Register & State Machine 524 monitors the Controller 310 Packet SDRAM Write Controller 522 and the Controller 310 Packet SDRAM Bank & Row Address in order to track each Bank's "Active" or "Idle" state. If a Bank has just been made "Active", it also stores that Bank's Row Address, and checks the Row Address to determine whether it is a "Code" or "Packet" Data Block. The Controller 310 Packet SDRAM Bank Status Register 524 uses the same data format as the inbound network processor 106C Bank Status Register 504.

The Controller 310 Packet SDRAM Bank State Machine 524 defines the control logic used to resolve the various Packet SDRAM bus transactions, and then to set or reset the appropriate Bank Status Register locations. The Packet SDRAM Bank State Machine 524 uses the same logic algorithm as the inbound network processor 106C Bank State Machine 600 shown in FIG. 6.

Just prior to a Packet SDRAM Switch, the contents of this Status Register 524 are compared with the outbound network processor 106D Bank Status Register to ensure both SDRAM "B" & "C" 306A, 306B are synchronized The Switching Logic & State Machine 526 monitors the outbound network processor 106D Command Decoder 514 and the Packet SDRAM Write Controller 522 in order to determine the correct time switch control of Packet SDRAM's "B" and "C" 306A, 306B between the SDRAM Control Logic 124 controller 310 and the outbound network processor 106D.

When the Packet SDRAM Write Controller 522 has completed moving data from the FIFO 312 into the appropriate Packet SDRAM 306A, 306B, and it has synchronized the Active & Pre-charge states of the Packet SDRAM's 306A, 306B, it will signal the Switching Logic 526 to initiate a Packet SDRAM Switch. On the next clock cycle the Switching Logic 526 will "bridge" the Control and Address Bus of both Packet SDRAM's 306A, 306B to the outbound network processor 106D Processor (however, the Data Bus is not bridged). The bridge allows the Active, Pre-charge & Refresh states of both Packet SDRAM's 306A, 306B to remain synchronized, while waiting for the correct moment to finalize the switch.

If an Active or Pre-charge command is issued by outbound network processor 106D during the clock period that the bridge was commanded, but not yet completed, then that command will not be captured in the Controller 310 controlled Packet SDRAM 306A, 306B, and synchronization will be lost. As such, an Abort must be issued by the Switching Logic 526, which breaks the Bridge, and returns control back to the Packet SDRAM Write Controller 522. The Packet SDRAM Write Controller 522 will then re-synchronize the two Packet SDRAM's 306A, 306B and reinitiate a Packet SDRAM switch.

Once the Bridge is successfully completed, the Switching Logic 526 waits for the proper time to complete the switch. If outbound network processor 106D is currently performing a write command, it may be safely assumed that it is writing to the Code SDRAM 308 since the System Rules state that outbound network processor 106D must never write to the Packet SDRAM 306A, 306B. As such, it may make the switch right away.

If a Write command is not in process, the Switching Logic 526 checks to see if a Read command has been issued in any of the preceding three clock cycles. If Read commands have been present in at least one the last 3 clocks, it may indicate that outbound network processor 106D is performing Random Reads. The Switch Logic 526 will not make the switch while Random Reads are being performed. Once the last 3 clocks are "Read Command Free", we can be assured that a Random Read is not in process, and the State Machine will progress to the next "Check for Burst Read" state.

When the Switching Logic 526 is in the Check for Burst Read state, it will count 8 clock cycles to ensure that if a Burst Read is in process, it will complete before the switch is made. At the end of 8 clocks, the Switching Logic 526 will automatically make the Packet SDRAM switch. In addition, if a Read or Write Command is decoded while waiting for the 8 clocks to pass, it is now a perfect time to perform the switch, and the switch will occur immediately.

Figure 10:
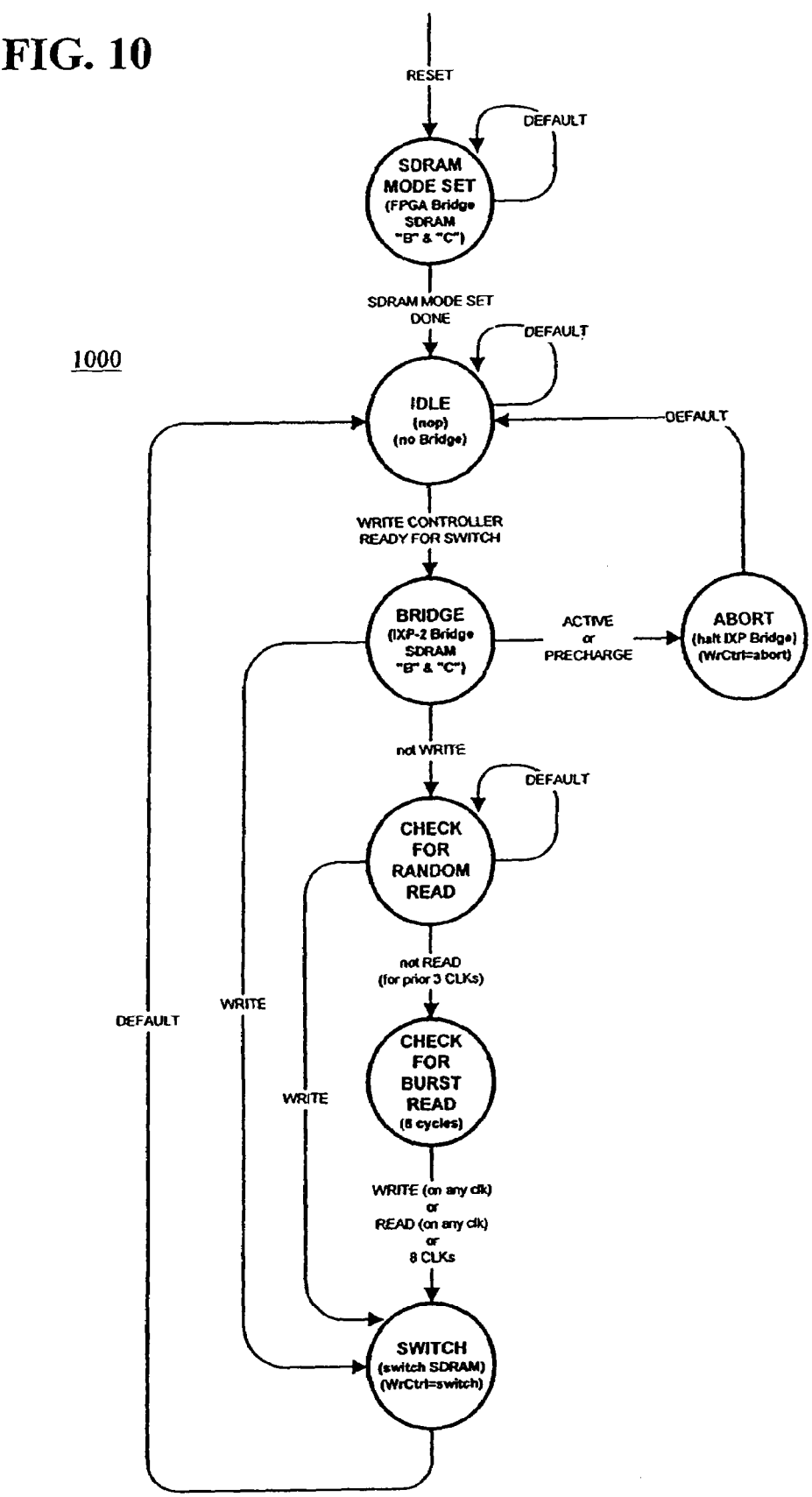
FIG. 10 depicts a state diagram of the packet SDRAM "B" "C" switch state machine for use with the embodiment of FIG. 5.

The Switching Logic 526 also has a special state that is used when coming out of reset. Right after reset, outbound network processor 106D will send out the SDRAM Mode Register Set command. However, the Packet SDRAM's 306A, 306B need a setting that is slightly modified from the one used by the Code SDRAM 308. To accommodate this need, the SDRAM Control Logic 124 controller 310 modifies the Code SDRAM 308 Set Mode command and issues it to the Packet SDRAM's 306A, 306B. To permit this, the Switching Logic 526 bridges both first replicated outbound shared memory bank 306A & "C" to the SDRAM Control Logic 124 controller 310 while it sets the replicated outbound shared memory banks 306A, 306B Mode Registers. After the Mode Register is set, the Switching Logic 526 commences its normal operation (as described earlier in this section). FIG. 10 depicts a state diagram 1000 of the packet SDRAM "B" "C" 306A, 306B switch state machine. Following a system reset, the system sets each SDRAM 306A, 306B mode and enters an idle state. If the Write Controller 522 is ready for a switch, the system will bridge the SDRAM to the SDRAM Contol Logic 124 controller 310. If a write command is issued, the system will switch SDRAMs. Otherwise, the system will check for a random read command. If no read command is issued within the prior 3 clock cycles, the system will check for a burst read command. At this point, the system will switch SDRAMs only if a write or read command is issued, or if 8 clock cycles pass The outbound network processor 106D Code/Packet SDRAM Output Enable Control & State Machine 528 monitors the outbound network processor 106D Command Decoder 514, outbound network processor 106D Bank Status Register 524, and the outbound network processor 106D Bank Address in order to track Packet SDRAM ("B" or "C") 306A, 306B and outbound working storage bank 308 access cycles. The Output Enable Control 528 then determines if the Code Data ZDG (Zero Delay Gate) or the outbound network processor 106D Packet Read Data Register shall have its outputs enabled.

When a Packet Data Read is detected, the Packet Read Data Register's outputs are enabled, and the Code Data ZDG is disabled. For all other conditions, the output enables are reversed.

Figure 11:
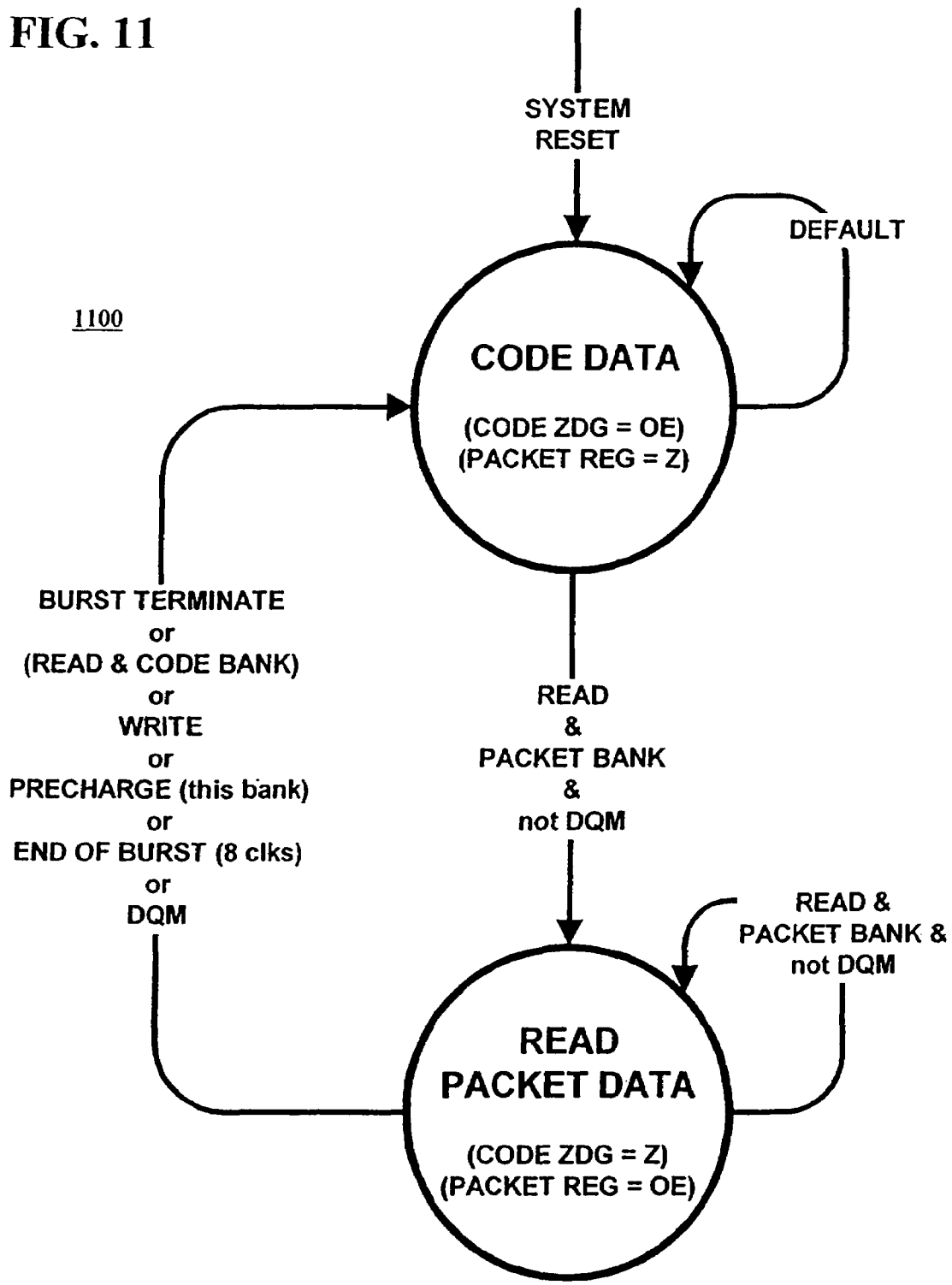
FIG. 11 depicts a state diagram of the code/packet SDRAM output enable state machine for use with the embodiment of FIG. 5.

In addition, since an SDRAM control logic 124 rule (or limitation) states that outbound network processor 106D will only "read" from the Packet SDRAM 306A, 306B, this output enable controller 528 assumes that all outbound network processor 106D "write" accesses must be for the Code Data SDRAM 308. Second, if a DQM is issued by outbound network processor 106D during a Packet SDRAM burst read, the output enable controller 528 switches over to the Code Data ZDG for that cycle. This is because the DQM may be preparing for a Code Data write, and this controller must anticipate that possibility. This rule is shown in FIG. 11 which depicts the state diagram 1100 of the code/packet SDRAM output enable state machine. As shown, the system remains in a 'code data state' if a burst terminate, read & code bank, write, or precharge (this bank), end of burst, or a DQM command. The system will only enter the read packet data state on a read & packet bank & not DQM command.

A standard I2C™ Philips serial bus standard based on a two wire protocol slave interface 530 allows the Controller 310 Control Register to be set, and Status Register read by an external controller. More information about this serial bus standard may be found at the web site semiconductors.philips.com/i2c/, last accessed May 15, 2001. It is not required to establish communications with the Controller 310 since all the control registers boot-up with a default value. However, it is necessary if any of the default values need to be changed. The maximum data & clock rate of the I2C interface is approximately 25 MHz.

The Packet SDRAM Control Logic 124 controller 310 Interrupt Controller 532 is provided to alert the network processors 106C, 106D of a warning or error condition. Interrupt sources include a number of FIFO level warnings, FIFO overflow, and a Packet Address FIFO vs. Packet Data FIFO misalignment. Refer to the table below.

The Interrupt output may be configured to provide positive or negative logic, and may be either an edge (50 nanoseconds (nS) pulse), or level output. If level output is selected, reading the interrupt source register clears the Interrupt output.

3.6 Packet SDRAM Control Logic 118 controller 310 Control Register

| FUNCTION | LOGIC | DEFAULT VALUE | I2C ADDRESS | I2C BIT POSITION |
|---|---|---|---|---|
| FIFO 50% Full Interrupt Enable | '0' = Disable '1' = Enable | Disable | TBD + 0 | 0 |
| FIFO 75% Full Interrupt Enable | '0' = Disable '1' = Enable | Disable | TBD + 0 | 1 |
| FIFO 90% Full Interrupt Enable | '0' = Disable '1' = Enable | Disable | TBD + 0 | 2 |
| FIFO 100% Full(overflow error!) Interrupt Enable | '0' = Disable '1' = Enable | Disable | TBD + 0 | 3 |
| Packet Address &Packet Data FIFO misalignment Interrupt Enable | '0' = Disable '1' = Enable | Disable | TBD + 0 | 4 |
| Interrupt Output Type | '0' = Negative Logic '1' = Positive Logic | Positive | TBD + 0 | 5 |
| Interrupt Output Polarity | '0' = Edge(50 nS pulse) '1' = Level(reset by int.reglster read) | Edge | TBD + 0 | 6 |
| Warm Reset | '1' = Reset(switches to '0' after boot) | Reset | TBD+ 0 | 7 |

The controller 310 status register 536 is detailed in the table below:

| FUNCTION | LOGIC | I2C ADDRESS | I2C BIT POSITION |
|---|---|---|---|
| SDRAM Control Logic 124 controller 310 ID | Binary value | Base address + 1 | 0–7 |
| SDRAM Control Logic 124 controller 310 Rev. | Binary value | Base address + 2 | 0–7 |
| FIFO 50% Full Interrupt Enabled | '0' = Disabled '1' = Enabled | Base address + 3 | 0 |
| FIFO 75% Full Interrupt Enabled | '0' = Disabled '1' = Enabled | Base address + 3 | 1 |
| FIFO 90% Full Interrupt Enabled | '0' = Disabled '1' = Enabled | Base address + 3 | 2 |
| FIFO 100% Full Interrupt Enabled | '0' = Disabled '1' = Enabled | Base address + 3 | 3 |
| Address & Data FIFO misalign Int. En. | '0' = Disabled '1' = Enabled | Base address + 3 | 4 |
| FIFO 50% Full Interrupt source | '0' = not intr. Source '1' = interrupt source | Base address + 4 | 0 |

-continued

| FUNCTION | LOGIC | I2C ADDRESS | I2C BIT POSITION |
|---|---|---|---|
| FIFO 75% Full Interrupt source | '0' = not intr. Source '1' = interrupt source | Base address + 4 | 1 |
| FIFO 90% Full Interrupt source | '0' = not intr. Source '1' = interrupt source | Base address + 4 | 2 |
| FIFO 100% Full Interrupt source | '0' = not intr. Source '1' = interrupt source | Base address + 4 | 3 |
| Address & Data FIFO misalign Interrupt | '0' = not intr. Source '1' = interrupt source | Base address + 4 | 4 |
| FIFO 25% Full Status | '0' = FIFO < 25% full '1' = FIFO > 25% full | Base address + 5 | 5 |
| FIFO 50% Full Status | '0' = FIFO < 50% full '1' = FIFO > 50% full | Base address + 5 | 0 |
| FIFO 75% Full Status | '0' = FIFO < 75% full '1' = FIFO > 75% full | Base address + 5 | 1 |
| FIFO 90% Full Status | '0' = FIFO < 90% full '1' = FIFO > 90% full | Base address + 5 | 2 |
| FIFO 100% Full Status | '0' = FIFO < 100% full '1' = FIFO overflow | Base address + 5 | 3 |
| Address & Data FIFO misalign interrupt | '0' = FIFO OK '1' = FIFO's Misalign | Base address + 5 | 4 |

It is therefore intended that the foregoing detailed description be regarded as illustrative rather than limiting, and that it be understood that it is the following claims, including all equivalents, that are intended to define the spirit and scope of this invention. For example, it will be appreciated that alternative interconnecting bus widths and operating frequencies may be used and are dependent upon the components used and the implementation of the design.

We claim:

1. A method of processing data in a bi-directional processing device, the method comprising:
   (a) receiving said data by a first processor from a bi-directional interface, said first processor operative to perform a first task on said data thereby resulting in processed data;
   (b) accessing a shared memory by said first processor to store said processed data in a the shared memory;
   (c) accessing said shared memory by a second processor to retrieve said processed data from said shared memory to perform a second task on said processed data thereby resulting in secondarily processed data, the accessing of said shared memory by said second processor not being based on an indication from said first processor; and
   (d) transmitting, selectively, said secondarily processed data to said bi-directional interface from said second processor.

2. The method of claim 1, wherein said first task comprises at least one of inspection and analysis.

3. The method of claim 1, wherein said second task comprises taking an action on said processed data.

4. The method claim 3, wherein said taking an action comprises at least one of deleting, modifying and transmitting said processed data.

5. The method of claim 1, wherein each of said first and second processors is characterized by a hi-directional bandwidth, said method further comprising utilizing said bi-directional bandwidth for uni-directional data flow.

6. The method of claim 1, wherein said storing further comprises storing said processed data such that said second processor is unaware of how said processed data was stored in said shared memory.

7. The method of claim 1, wherein first and second processors comprise network processors.

8. The method of claim 1, wherein said transmitting is further based on a result of said second task.

9. A bi-directional data processor comprising:
   a first processor coupled with a bi-directional interface and operative to receive data from said bi-directional interface and perform a first task on said data thereby resulting in processed data;
   a shared memory coupled with said first processor, wherein said first processor is further operative to access said shared memory to store said processed data in said shared memory; and
   a second processor coupled with said shared memory and said bi-directional interface, said second processor operative to access said shared memory to retrieve said stored processed data from said shared memory, perform a second task on said stored processed data thereby resulting in secondarily processed data and selectively transmit said secondarily processed data back to said bi-directional interface, the accessing of said shared memory by said second processor not being based on an indication from said first processor.

10. The bi-directional data processor of claim 9, wherein said first task comprises at least one of inspection and analysis.

11. The bi-directional data processor of claim 9, wherein said second task comprises taking an action on said stored processed data.

12. The bi-directional data processor claim 11, wherein said taking an action comprises at least one of deleting, modifying and transmitting said processed data.

13. The bi-directional data processor of claim 9, wherein each of said first and second processors are characterized by a bi-directional bandwidth, said bi-directional bandwidth being utilized for uni-directional data flow.

14. The bi-directional data processor of claim 9, wherein said second processor is unaware of how said processed data was stored in said shared memory.

15. The bi-directional data processor of claim 9, wherein said first and second processors comprise network processors.

16. The bi-directional data processor of claim 9, wherein said the selective transmission by said second processor is further based on a result of said second task.

17. An apparatus for processing a bi-directional dataflow comprising:
   first processor means for receiving data from a bi-directional interface and performing a first task on said data thereby resulting in processed data;
   shared memory means coupled with said first processor, wherein said first processor is further operative to access said shared memory means to store said processed data in said shared memory means; and second processor means coupled with said shared memory and operative to access said shared memory means to retrieve said stored processed data from said shared memory, perform a second task on said processed data thereby resulting in secondly processed data and selectively transmit said data back to said bi-directional interface, the accessing of said shared memory means by said second processor means not being based on an indication from said first processor means.

* * * * *

UNITED STATES PATENT AND TRADEMARK OFFICE
CERTIFICATE OF CORRECTION

PATENT NO. : 7,428,618 B2
APPLICATION NO. : 11/060989
DATED : September 23, 2008
INVENTOR(S) : Zahid Najam et al.

Page 1 of 1

It is certified that error appears in the above-identified patent and that said Letters Patent is hereby corrected as shown below:

In the Claims

In column 30, claim 4, line 3, after "The method" insert --of--.

In column 30, claim 5, line 7, after "is characterized by a" delete "hi-directional" and substitute --bi-directional-- in its place.

In column 30, claim 12, line 43, after "data processor" insert --of--.

In column 32, claim 17, line 1, after "thereby resulting in" delete "secondly" and substitute --secondarily-- in its place.

Signed and Sealed this

Second Day of June, 2009

JOHN DOLL
*Acting Director of the United States Patent and Trademark Office*